United States Patent
Park et al.

(10) Patent No.: US 6,184,294 B1
(45) Date of Patent: Feb. 6, 2001

(54) BLENDS OF α-OLEFIN/VINYLIDENE AROMATIC MONOMER OR HINDERED ALIPHATIC VINYLIDENE MONOMER INTERPOLYMERS WITH POLYOLEFINS

(75) Inventors: Chung P. Park, Baden-Baden (DE); Johan Thoen, Terneuzen (NL); Rene Broos, Bornem (BE); Martin J. Guest; Yunwa W. Cheung, both of Lake Jackson, TX (US); Bharat I Chaudhary; John J. Gathers, both of Pearland, TX (US); Lawrence S. Hood, Saginavi, MI (US)

(73) Assignee: The Dow Chemical Company, Midland, MI (US)

( * ) Notice: Under 35 U.S.C. 154(b), the term of this patent shall be extended for 0 days.

(21) Appl. No.: 09/254,252

(22) PCT Filed: Sep. 4, 1997

(86) PCT No.: PCT/US97/15533

§ 371 Date: Mar. 2, 1996

§ 102(e) Date: Mar. 2, 1996

(87) PCT Pub. No.: WO92/27755

PCT Pub. Date: Oct. 19, 1995

Related U.S. Application Data

(60) Provisional application No. 60/025,431, filed on Sep. 4, 1996.

(51) Int. Cl.[7] ............... C08F 8/00; C08L 33/04; C08L 35/02

(52) U.S. Cl. ............ 525/191; 525/216; 525/222; 525/227; 525/228; 525/232; 525/236; 525/237; 525/240

(58) Field of Search ................... 525/191, 216, 525/222, 227, 228, 232, 236, 237, 240

(56) References Cited

U.S. PATENT DOCUMENTS

| | | | |
|---|---|---|---|
| 3,504,068 | 3/1970 | Zizlsperger et al. | 264/41 |
| 3,573,152 | 3/1971 | Wiley et al. | 161/60 |
| 3,953,558 | 4/1976 | Hatano et al. | 264/22 |
| 4,076,698 | 2/1978 | Anderson et al. | 526/348.6 |
| 4,168,353 | 9/1979 | Kitamori | 521/59 |
| 4,379,859 | 4/1983 | Hirosawa et al. | 521/59 |
| 4,464,484 | 8/1984 | Yoshimura | 521/58 |
| 4,824,720 | 4/1989 | Malone | 428/294 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,075,475 | 12/1991 | Dougherty et al. | 556/412 |
| 5,096,867 | 3/1992 | Canich | 502/103 |
| 5,132,380 | 7/1992 | Stevens et al. | 526/126 |
| 5,189,192 | 2/1993 | LaPointe et al. | 556/11 |
| 5,244,996 | 9/1993 | Kawasaki et al. | 526/347 |
| 5,321,106 | 6/1994 | LaPointe | 526/126 |
| 5,347,024 | 9/1994 | Nickias et al. | 556/11 |
| 5,350,723 | 9/1994 | Neithamer et al. | 502/104 |
| 5,374,696 | 12/1994 | Rosen et al. | 526/126 |
| 5,399,635 | 3/1995 | Neithamer et al. | 526/126 |
| 5,460,818 | * 10/1995 | Park et al. | 426/415 |
| 5,460,933 | 10/1995 | Brick et al. | 430/566 |
| 5,556,928 | 9/1996 | Devore | 526/127 |

FOREIGN PATENT DOCUMENTS

| | | |
|---|---|---|
| 0416815 B1 | 8/1990 | (EP) . |
| 0514828 A1 | 5/1992 | (EP) . |
| 0521723 A1 | 12/1992 | (EP) . |

OTHER PUBLICATIONS

Dr. Chung Poo Park, *Polyolefin Foam*, Ch. 9, Hanser Publishers, pp. 188–242 (1991).

D'Anniello, et al, *Journal if Applied Polymer Science*, vol. 48, pp. 1701–1706, (1995).

J. C. Randall, *Polymer Sequence Determination. Carbon–13 NMR Method*, Academic Press NY, pp. 71–92, (1977).

* cited by examiner

Primary Examiner—Nathan M. Nutter

(57) ABSTRACT

A fabricated article other than a film comprising a thermoplastic blend prepared from polymeric materials consisting of; (A) from 1 to 99 weight percent of at least one interpolymer made from monomer components comprising (1) from 0.5 to 65 mole percent of (a) at least one aromatic vinylidene monomer, or (b) at least one hindered aliphatic or cycloaliphatic vinylidene monomer, or (c) a combination of at least one aromatic vinylidene monomer and at least one hindered aliphatic or cycloaliphatic vinylidene monomer, and (2) from 99.5 to 35 mole percent of at least one aliphatic α-olefin having from 2 to 20 carbon atoms; and (B) from 99 to 1 weight percent of at least one polymer made from monomer components comprising at least one α-olefin having from 2 to 20 carbon atoms.

These articles possess improved properties when compared to the properties of articles derived from the individual polymers comprising the blend. These articles are useful in the preparation of injection molded parts, bitumen and asphalt modification, hot melt and pressure sensitive adhesive systems.

17 Claims, No Drawings

BLENDS OF α-OLEFIN/VINYLIDENE AROMATIC MONOMER OR HINDERED ALIPHATIC VINYLIDENE MONOMER INTERPOLYMERS WITH POLYOLEFINS

CROSS REFERENCE TO RELATED APPLICATIONS

This application is a national application of International Application No. PCT/US 97/15533 filed on Sep. 4, 1997, claiming priority from U.S. Provisional Application Ser. No. 60/025,431, filed on Sep. 4, 1996, all of which are incorporated herein by reference in their entirety.

STATEMENT REGARDING FEDERALLY SPONSORED RESEARCH OR DEVELOPMENT

Not applicable.

FIELD OF THE INVENTION

The present invention pertains to blends (A) of interpolymers made from monomer components comprising at least one α-olefin and at least one aromatic vinylidene monomer and/or at least one hindered aliphatic vinylidene monomer and/or at least one cycloaliphatic vinylidene monomer and (B) olefinic polymers.

The generic class of materials covered by α-olefin/hindered vinylidene monomer substantially random interpolymers and including materials such as α-olefin/vinyl aromatic monomer interpolymers are known in the art and offer a range of material structures and properties which makes them useful for varied applications, such as compatibilizers for blends of polyethylene and polystyrene as described in U.S. Pat. No. 5,460,818.

One particular aspect described by D'Anniello et al. (Journal of Applied Polymer Science, Volume 58, pages 1701–1706 (1995)) is that such interpolymers can show good elastic properties and energy dissipation characteristics. In another aspect, selected interpolymers can find utility in adhesive systems, as illustrated in U.S. Pat. No. 5,244,996, issued to Mitsui Petrochemical Industries Ltd.

Although of utility in their own right, Industry is constantly seeking to improve the applicability of these interpolymers, for example to extend the temperature range of application. Such enhancements may be accomplished via additives, but it is desirable to develop technologies to provide improvements in processability or performance without the addition of additives or further improvements than can be achieved with the addition of additives.

Park et al., in WO 95/27755 describes a method of increasing the toughness and solvent resistance of a homopolymer or interpolymer of a monovinylidene aromatic monomer, by blending it with an olefin polymer such as a polyethylene or ethylene/octene copolymer. However because of the incompatability of these two types of resins, there is a requirement for a compatabilizer which Park teaches can be a pseudo random interpolymer of an aliphatic α-olefin and a vinylidene aromatic monomer.

Bradfute et al., in WO 95/32095 discloses multilayer films having at least one layer which is an ethylene/styrene copolymer.

McKay et al., in WO 96/07681 describes a thermoset elastomer comprising a crosslinked pseudorandom or substantially random interpolymer of at least one α-olefin, at least one vinylidene aromatic compound, and at least one diene. The subject invention also provides a thermoplastic vulcanizate comprising the thermoset elastomer as provided in a themoplastic polyolefin matrix.

There is a need to provide materials based on α-olefin/vinylidene aromatic monomer interpolymers with superior performance characteristics to the unmodified polymers, which will further expand the utility of this interesting class of materials. This superior characteristics include, but are not limited to, low temperature toughness, mechanical strength and melt processability.

The present invention pertains to a fabricated article other than a film comprising a blend of polymeric materials consisting of (A) from 1 to 99 weight percent of one or more α-olefin/vinylidene monomer non-crosslinked substantially random interpolymers, wherein the distribution of the monomers of said interpolymers can be described by the Bernoulli statistical model or by a first or second order Markovian statistical model, and each having been made from monomer components comprising:
(1) from 0.5 to 65 mole percent of either
(a) at least one vinylidene aromatic monomer, or
(b) at least one hindered aliphatic vinylidene monomer, corresponding to the formula:

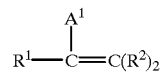

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system or
(c) a combination of at least one vinylidene aromatic monomer and at least one hindered aliphatic vinylidene monomer; and
(2) from 35 to 99.5 mole percent of at least one aliphatic α-olefin having from 2 to 20 carbon atoms; and
(B) from 99 to 1 weight percent of one or more homopolymers or copolymers of monomer components comprising aliphatic α-olefins having from 2 to 20 carbon atoms, or aliphatic α-olefins having from 2 to 20 carbon atoms and containing polar groups.

The present invention also pertains to an expandable composition comprising the aforementioned blend and a foaming or expansion agent.

The blends and or foams of the present invention can "comprise", "consist essentially of" or "consist of" any two or more of such polymers or interpolymers enumerated herein.

These blends provide an improvement in one or more of the polymer properties such as, but not limited to, mechanical properties, low temperature performance, relaxation/damping behavior and melt flow properties as compared to a like property of either of the individual polymers of said blend.

The term "interpolymer" is used herein to indicate a polymer wherein at least two different monomers are polymerized to make the interpolymer.

The term "copolymer" as employed herein means a polymer wherein at least two different monomers are polymerized to form the copolymer.

The term "mer(s)" means the polymerized unit of the polymer derived from the indicated monomer(s).

The term "monomer residue" or "polymer units derived from" means that portion of the polymerizable monomer molecule which resides in the polymer chain as a result of being polymerized with another polymerizable molecule to make the polymer chain.

The term "substantially random" in the substantially random interpolymer resulting from polymerizing one or more α-olefin monomers and one or more vinylidene aromatic monomers or hindered aliphatic or cycloaliphatic vinylidene monomers, and optionally, with other polymerizable ethylenically unsaturated monomer(s) as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method,* Academic Press New York, 1977, pp. 71–78. Preferably, the substantially random interpolymer resulting from polymerizing one or more a-olefin monomers and one or more vinylidene aromatic monomer, and optionally, with other polymerizable ethylenically unsaturated monomer(s) does not contain more than 15 percent of the total amount of vinylidene aromatic monomer in blocks of vinylidene aromatic monomer of more than 3 units. More preferably, the interpolymer was not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time is, for example, from 1 to 90, preferably from 20 to 80, more preferably from 30 to 70, it is intended that values such as 15 to 85, 22 to 68, 43 to 51, 30 to 32 are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

At The interpolymers suitable as component (A) for the blends comprising the present invention include substantially random interpolymers each having been made from monomer components comprising one or more α-olefin monomers with one or more vinylidene aromatic monomers and/or one or more hindered aliphatic or cycloaliphatic vinylidene monomers, and optionally with other polymerizable ethylenically unsaturated monomer(s). The interpolymers are also prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s).

Suitable α-olefin monomers include for example, α-olefin monomers containing from 2 to 20, preferably from 2 to 12, more preferably from 2 to 8 carbon atoms. Preferred such monomers include ethylene, propylene, butene-1, 4-methyl-1-pentene, hexene-1 and octene-1. Most preferred are ethylene or a combination of ethylene with $C_{3-8}$ α-olefins. These α-olefins do not contain an aromatic moiety.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinylidene aromatic monomers which can be employed to prepare the interpolymers employed in the blends include, for example, those represented by the following formula:

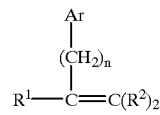

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals is containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Exemplary monovinylidene aromatic monomers include styrene, vinyl toluene, .αa-methylstyrene, t-butyl styrene, chlorostyrene, including all isomers of these compounds. Particularly suitable such monomers include styrene and lower alkyl- or halogen-substituted derivatives thereof. Preferred monomers include styrene, a-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic monovinylidene monomer is styrene.

By the term "hindered aliphatic or cycloaliphatic vinylidene compounds", it is meant addition polymerizable vinylidene monomers corresponding to the formula:

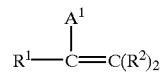

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. α-Olefin monomers containing from 2 to 20 carbon atoms and having a linear aliphatic structure such as propylene, butene-1, hexene-1 and octene-1 are not considered as hindered aliphatic monomers. Preferred hindered aliphatic or cycloaliphatic vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, and norbornyl. Most preferred hindered aliphatic or cycloaliphatic vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The interpolymers of one or more α-olefins and one or more monovinylidene aromatic monomers and/or one or more hindered aliphatic or cycloaliphatic vinylidene monomers employed in the present invention are substantially random polymers. These interpolymers usually contain from 0.5 to 65, preferably from 1 to 55, more preferably from 2 to 50 mole percent of at least one vinylidene aromatic monomer and/or hindered aliphatic or cycloaliphatic vinylidene monomer and from 35 to 99.5, preferably from 45 to 99, more preferably from 50 to 98 mole percent of at least one aliphatic α-olefin having from 2 to 20 carbon atoms.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The number average molecular weight (Mn) of the polymers and interpolymers is usually greater than 5,000, preferably from 20,000 to 1,000,000, more preferably from 50,000 to 500,000.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinylidene aromatic homopolymer may be formed due to homopolymerization of the vinylidene aromatic monomer at elevated temperatures. The presence of vinylidene aromatic homopolymer is in general not detrimental for the purposes of the present invention and can be tolerated. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent based on the total weight of the interpolymers of vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers can be produced by polymerization or copolymerization of the appropriate monomers in the presence of a metallocene catalyst and a co-catalyst as described in EP-A-0,416,815 by James C. Stevens et al., and U.S. Pat. No. 5,703,187 by Francis J. Timmers. Preferred operating conditions for such polymerization reactions are pressures from atmospheric up to 3,000 atmospheres and temperatures from −30° C. to 200° C.

Examples of suitable catalysts and methods for preparing the substantially random interpolymers are disclosed in EP-A-514,828; as well as U.S. Pat. Nos: 5,055,438; 5,057,475; 5,096,867; 5,064,802; 5,132,380; 5,189,192; 5,321, 106; 5,347,024; 5,350,723; 5,374,696; 5,399,635; 5,470,993; 5,703,187; and 5,721,185.

The substantially random α-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992).

Also suitable are the substantially random interpolymers which comprise at least one α-olefin/vinyl aromatic/vinyl aromatic/α-olefin tetrad disclosed in Wo 98/09999 by Francis J. Timmers et al. These interpolymers contain additional signals with intensities greater than three times the peak to peak noise. These signals appear in the chemical shift range 43.70–44.25 ppm and 38.0–38.5 ppm. Specifically, major peaks are observed at 44.1, 43.9 and 38.2 ppm. A proton test NMR experiment indicates that the signals in the chemical shift region 43.70–44.25 ppm are methine carbons and the signals in the region 38.0–38.5 ppm are methylene carbons.

In order to determine the carbon$^{-13}$ NMR chemical shifts of the interpolymers described, the following procedures and conditions are employed. A five to ten weight percent polymer solution is prepared in a mixture consisting of 50 volume percent 1,1,2,2-tetrachloroethane-d$_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon$^{-13}$ NMR peaks but with slightly different chemical shifts.

These interpolymers are prepared by conducting the polymerization at temperatures of from −30° C. to 250° C. in the presence of such catalysts as those represented by the formula

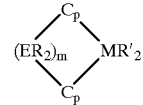

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to 30 preferably from 1 to 20 more preferably from 1 to 10 carbon or silicon atoms; each R' is independently, each occurrence, H, halo, hydrocarbyl, hyrocarbyloxy, silahydrocarbyl, hydrocarbylsilyl containing up to 30 preferably from 1 to 20 more preferably from 1 to 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

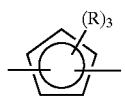

wherein each R is independently, each occurrence, H, hydrocarbyl, silahydrocarbyl, or hydrocarbylsilyl, containing up to 30 preferably from 1 to 20 more preferably from 1 to 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl))zirconium dichloride, racemic-(dimethylsilanediyl)-bis-(2-methyl-4-phenylindenyl)) zirconium 1,4-diphenyl-1,3-butadiene, racemic-(dimethylsilanediyl)-bis-(2-methyl-4-phenylindenyl)) zirconium di-$C_{1-4}$ alkyl, racemic-(dimethylsilanediyl)-bis-(2-methyl-4-phenylindenyl)) zirconium di-$C_{1-4}$ alkoxide, or any combination thereof.

Further preparative methods for the interpolymer component (A) of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am.Chem.Soc., Div.Polym.Chem.*) Volume 35, pages 686, 687 [1994]) have reported copolymerization using a $MgCl_2/TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp 1071–1083, 1997) have described the influence of polymerization conditions on the copolymerization of styrene with ethylene using $Me_2Si(Me_4Cp)$ (N-tert-butyl)$TiCl_2$/methylaluminoxane Ziegler-Natta catalysts. The manufacture of α-olefin/vinyl aromatic monomer interpolymers such as propylene/styrene and butene/styrene are described in U.S. Pat. No. 5,244,996, issued to Mitsui Petrochemical Industries Ltd.

Olefinic polymers suitable for use as component (B) in the blends according to the present invention are aliphatic α-olefin homopolymers or interpolymers, or interpolymers of one or more aliphatic α-olefins and one or more non-aromatic monomers interpolymerizable therewith such as $C_2$–$C_{20}$ α-olefins or those aliphatic α-olefins having from 2 to 20 carbon atoms and containing polar groups. Suitable aliphatic α-olefin monomers which introduce polar groups into the polymer include, for example, ethylenically unsaturated nitrites such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethylenically unsaturated dicarboxylic acid imides such as N-alkyl or N-aryl maleimides such as N-phenyl maleimide. Preferably such monomers containing polar groups are acrylic acid, vinyl acetate, maleic anhydride and acrylonitrile. Halogen groups which can be included in the polymers from aliphatic α-olefin monomers include fluorine, chlorine and bromine; preferably such polymers are chlorinated polyethylenes (CPEs). Preferred olefinic polymers for use in the present invention are homopolymers or interpolymers of an aliphatic, including cycloaliphatic, α-olefin having from 2 to 18 carbon atoms. Suitable examples are homopolymers of ethylene or propylene, and interpolymers of two or more α-olefin monomers. Other preferred olefinic polymers are interpolymers of ethylene and one or more other α-olefins having from 3 to 8 carbon atoms. Preferred comonomers include 1-butene, 4-methyl-1-pentene, 1-hexene, and 1-octene. The olefinic polymer blend component (B) may also contain, in addition to the α-olefin, one or more non-aromatic monomers interpolymerizable therewith. Such additional interpolymerizable monomers include, for example, $C_4$–$C_{20}$ dienes, preferably, butadiene or 5 ethylidene-2-norbornene. The olefinic polymers can be further characterized by their degree of long or short chain branching and the distribution thereof.

One class of olefinic polymers is generally produced by a high pressure polymerization process using a free radical initiator resulting in the traditional long chain branched low density polyethylene (LDPE). LDPE employed in the present composition usually has a density of less than 0.94 g/cc (ASTM D 792) and a melt index of from 0.01 to 100, and preferably from 0.1 to 50 grams per 10 minutes (as determined by ASTM Test Method D 1238, condition I).

Another class is the linear olefin polymers which have an absence of long chain branching, as the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

HDPE consists mainly of long linear polyethylene chains. The HDPE employed in the present composition usually has a density of at least 0.94 grams per cubic centimeter (g/cc) as determined by ASTM Test Method D 1505, and a melt index (ASTM-1238, condition I) in the range of from 0.01 to 100, and preferably from 0.1 to 50 grams per 10 minutes.

The heterogeneous LLDPE employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

A further class is that of the uniformly branched or homogeneous polymers (homogeneous LLDPE). The homogeneous polymers contain no long chain branches and have only branches derived from the monomers (if having more than two carbon atoms). Homogeneous polymers include those made as described in U.S. Pat. No. 3,645,992 (Elston), and those made using so-called single site catalysts in a batch reactor having relatively high olefin concentrations (as described in U.S. Pat. Nos. 5,026,798 and 5,055,438 (Canich). The uniformly branched/homogeneous polymers are those polymers in which the comonomer is randomly distributed within a given interpolymer molecule and wherein the interpolymer molecules have a similar ethylene/comonomer ratio within that interpolymer.

The homogeneous LLDPE employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers (SLOP) that may advantageously be used in component (B) of the blends of the present invention. These polymers have a processability similar to LDPE, but the strength and toughness of LLDPE. Similar to the traditional homogeneous polymers, the substantially linear ethylene/α-olefin interpolymers have only a single melting peak, as opposed to traditional Ziegler polymerized heterogeneous linear ethylene/α-olefin interpolymers which have two or more melting peaks (determined using differential scanning calorimetry). Substantially linear olefin polymers are disclosed in U.S. Pat. Nos. 5,272,236 and 5,278,272.

The density of the SLOP as measured in accordance with ASTM D-792 is generally from 0.85 g/cc to 0.97 g/cc, preferably from 0.85 g/cc to 0.955 g/cc, and especially from 0.85 g/cc to 0.92 g/cc.

The melt index, according to ASTM D-1238, Condition 190° C./2.16 kg (also known as $I_2$), of the SLOP is generally from 0.01 g/10 min. to 1000 g/10 min., preferably from 0.01 g/10 min. to 100 g/10 min., and especially from 0.01 g/10 min. to 10 g/10 min.

Also, included are the ultra low molecular weight ethylene polymers and ethyl-ene/α-olefin interpolymers described in the provisional patent application (application Ser. No. 60/010,403) entitled Ultra-Low Molecular Weight Polymers, filed provisionally on Jan. 22, 1996, in the names of M. L. Finlayson, C. C. Garrison, R. E. Guerra, M. J. Guest, B. W. S. Kolthammer, D. R. Parikh, and S. M. Ueligger. These ethylene/α-olefin interpolymers have $I_2$ melt indices greater than 1,000, or a number average molecular weight (Mn) less than 11,000.

The SLOP can be a homopolymer of $C_2$–$C_{20}$ olefins, such as ethylene, propylene, 4-methyl-1-pentene, etc., or it can be an interpolymer of ethylene with at least one $C_3$–$C_{20}$ α-olefin and/or $C_2$–$C_{20}$ acetylenically unsaturated monomer and/or $C_4$–$C_{18}$ diolefin. SLOP can also be an interpolymer of ethylene with at least one of the above $C_3$–$C_{20}$ α-olefins, diolefins and/or acetylenically unsaturated monomers in combination with other unsaturated monomers.

Especially preferred olefin polymers suitable for use as component (B) comprise LDPE, HDPE, heterogeneous and homogeneous LLDPE, SLOP, polypropylene (PP), especially isotactic polypropylene and rubber toughened polypropylenes, or ethylene-propylene interpolymers (EP), or chlorinated polyolefins (CPE), or ethylene-vinyl acetate copolymers, or ethylene-acrylic acid copolymers, or any combination thereof.

The blends of the present invention usually comprise from 1 to 99, preferably from 5 to 95 and more preferably from 10 to 90 percent by weight of the interpolymers containing at least one is aromatic vinylidene monomer residue or hindered aliphatic or cycloaliphatic vinylidene monomer residue or any combination thereof (component (A)) and from 1 to 99, preferably from 5 to 95, more preferably from 10 to 90 percent by weight of the polymers which do not contain any aromatic vinylidene monomer residue or hindered aliphatic or cycloaliphatic vinylidene monomer residue (component (B)). The percentages are based on the total amount of the polymers constituting the blends.

The blends of the present invention may be prepared by any suitable means known in the art such as, but not limited to, dry blending in a pelletized form in the desired proportions followed by melt blending in a screw extruder, or Banbury mixer. The dry blended pellets may be directly melt processed into a final solid state article by for example injection molding. Alternatively, the blends may be made by direct polymerization, without isolation of the blend components, using for example one or more catalysts in one reactor or two or-more reactors in series or parallel.

The foam structure of the present invention may take any physical configuration known in the art, such as sheet, plank, or bun stock. Other useful forms are expandable or foamable particles, moldable foam particles, or beads, and articles formed by expansion and/or coalescing and welding of those particles.

Excellent teachings to processes for making ethylenic polymer foam structures and processing them are seen in C. P. Park, "Polyolefin Foam", Chapter 9, *Handbook of Polymer Foams and Technology,* edited by D. Klempner and K. C. Frisch, Hanser Publishers, Munich, Vienna, New York, Barcelona (1991).

The present foam structure may be made by a conventional extrusion foaming process. The structure is generally prepared by heating an ethylenic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, or blender. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower Ethan that in which the foamable gel is maintained prior to extrusion through the die. The lower pressure may be superatmospheric or subatmospheric (vacuum), but is preferably at an atmospheric level.

The present foam structure may be formed in a coalesced strand form by extrusion of the ethylenic polymer material through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and methods for producing foam structures in coalesced strand form are seen in U.S. Pat. Nos. 3,573,152 and 4,824,720.

The present foam structure may also be formed by an accumulating extrusion process as seen in U.S. Pat. No. 4,323,528. In this process, low density foam structures having large lateral cross-sectional areas are prepared by: 1) forming under pressure a gel of the ethylenic polymer material and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

The present foam structure may also be formed into non-crosslinked foam beads suitable for molding into articles. To make the foam beads, discrete resin particles such as granulated resin pellets-are: suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484.

In a derivative of the above process, styrene monomer may be impregnated into the suspended pellets prior to impregnation with blowing agent to form a graft interpolymer with the ethylenic polymer material. The polyethylene/polystyrene interpolymer beads are cooled and discharged from the vessel substantially unexpanded. The beads are then expanded and molded by the conventional expanded polystyrene bead molding process. The process of making the polyethylene/polystyrene interpolymer beads is described in U.S. Pat. No. 4,168,353.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to blocks or shaped articles by a suitable molding method known in the art. (Some of the methods are taught in U.S. Pat. Nos. 3,504,068 and 3,953,558.) Excellent teachings of the above processes and molding methods are seen in C. P. Park, supra, p. 191, pp. 197–198, and pp. 227–229.

Blowing agents useful in making the present foam structure include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, or neopentane. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1 difluoroethane (HCFC-142b), 1,1-dichloro-2,2,2-trifluoroethane (HCFC-123) and 1-chloro-1,2,2,2-tetrafluoroethane(HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benezenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine. Preferred blowing agents include isobutane, HFC-152a, and mixtures of the foregoing.

The amount of blowing agents incorporated into the polymer melt material to make a foam-forming polymer gel is from 0.2 to 5.0, preferably from 0.5 to 3.0, and most preferably from 1.0 to 2.50 gram moles per kilogram of polymer.

Foams may be perforated to enhance or accelerate permeation of blowing agent from the foam and air into the foam. The foams may be perforated to form channels which extend entirely through the foam from one surface to another or partially through the foam. The channels may be spaced up to 2.5 centimeters apart and preferably up to 1.3 centimeters apart. The channels are present over substantially an entire surface of the foam and preferably are uniformly dispersed over the surface. The foams may employ a stability control agent of the type described above in combination with perforation to allow accelerated permeation or release of blowing agent while maintaining a dimensionally stable foam. Excellent teachings to perforation of foam are seen in U.S. Pat. No. Nos. 5,424,016 and 5,585,058.

Various additives may be incorporated in the present foam structure such as stability control agents, nucleating agents, inorganic fillers, pigments, antioxidants, acid scavengers, ultraviolet absorbers, flame retardants, processing aids, or extrusion aids.

A stability control agent may be added to the present foam to enhance dimensional stability. Preferred agents include amides and esters of $C_{10-24}$ fatty acids. Such agents are seen in U.S. Pat Nos. 3,644,230 and 4,214,054. Most preferred agents include stearyl stearamide, glycerol monostearate, glycerol monobehenate, and sorbitol monostearate. Typically, such stability control agents are employed in an amount ranging from 0.1 to 10 parts per hundred parts of the polymer.

The present foam structure exhibits excellent dimensional stability. Preferred foams recover 80 or more percent of initial volume within a month with initial volume being measured within 30 seconds after foam expansion. Volume is measured by a suitable method such as cubic displacement of water.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate. The amount of nucleating agent employed may range from 0.01 to 5 parts by weight per hundred parts by weight of a polymer resin.

The foam structure is substantially noncross-linked or uncross-linked. The alkenyl aromatic polymer material comprising the foam structure is substantially free of cross-linking. The foam structure contains no more than 5 percent gel per ASTM D-2765-84 Method A. A slight degree of cross-linking, which occurs naturally without the use of cross-linking agents or radiation, is permissible.

The foam structure has density of less than 250, more preferably less than 100 and most preferably from 10 to 70 kilograms per cubic meter. The foam has an average cell size of from 0.05 to 5.0, more preferably from 0.2 to 2.0, and most preferably 0.3 to 1.8 millimeters according to ASTM D3576.

The foam structure may take any physical configuration known in the art, such as extruded sheet, rod, plank, and profiles. The foam structure may also be formed by molding of expandable beads into any of the foregoing configurations or any other configuration.

The foam structure may be closed-celled or open-celled. A closed cell foam contains 80 percent or more closed cells or less than 20 percent open cells according to ASTM D2856-A.

Additives such as antioxidants (e.g., hindered phenols such as, for example, Irganox® 1010, a registered trademark of CIBA-GEIGY), phosphites (e.g., Irgafos® 168, a registered trademark of CIBA-GEIGY), U. V. stabilizers, cling additives (e.g., polyisobutylene), antiblock additives, colorants, pigments, fillers, can also be included in the interpolymers employed in the blends of and/or employed in the present invention, to the extent that they do not interfere with the enhanced properties discovered by Applicants.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend. However, in the instance of fillers, they could be employed in amounts up to 90 percent by weight based on the weight of the polymer or polymer blend.

The blends of the present invention, in addition to the production of foams, can be utilized to produce a wide range of fabricated articles such as, for example, calendered, cast and blown sheets and films and injection molded parts. The blends further find utilization in applications such as modifiers for bitumen and asphalt compositions and as components for hot melt and pressure sensitive adhesive systems.

The following examples are illustrative of the invention.

EXAMPLES 1–22

Interpolymer Preparations and Characteristics

Preparation of Interpolymers (A), (C), (G), (H) and (I)

Polymer is prepared in a 400 gallon (1.514 m$^3$) agitated semi-continuous batch reactor. The reaction mixture consisted of approximately 250 gallons (0.95 m$^3$) of a solvent comprising a mixture of cyclohexane (85wt %) & isopentane (15wt %), and styrene. Prior to addition, solvent, styrene and ethylene are purified to remove water and oxygen. The inhibitor in the styrene is also removed. Inerts are removed by purging the vessel with ethylene. The vessel is then pressure controlled to a set point with ethylene. Hydrogen is added to control molecular weight. Temperature in the vessel is controlled to set-point by varying the jacket water temperature on the vessel. Prior to polymerization, the vessel is heated to the desired run temperature and the catalyst components: Titanium: (N-1, 1-dimethyl-ethyl)dimethyl(1-(1,2,3,4,5-eta)-2,3,4,5-tetramethyl-2,4-cyclopentadien-1-yl)silanaminato))(2-)N)-dimethyl, CAS# 135072-62-7, Tris(pentafluorophenyl) boron, CAS# 001109-15-5, Modified methylaluminoxane Type 3A, CAS# 146905-79-5, are flow controlled, on a mole ratio basis of 1/3/5 respectively, combined and added to the vessel. After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, the catalyst flow is stopped, ethylene is removed from the reactor, 1000 ppm of Irganox™π1010 anti-oxidant (a registered trademark of CIBA-GEIGY) is then added to the solution and the polymer is isolated from the solution. The resulting polymers are isolated from solution by either stripping with steam in a vessel or by use of a devolatilizing extruder. In the case of the steam stripped material, additional processing is required in extruder like equipment to reduce residual moisture and any unreacted styrene.

TABLE 1A

| Sample No. | Solvent loaded (lbs) | Solvent loaded (kg) | Styrene loaded (lbs) | Styrene loaded (kg) | Pressure (Psig) | Pressure (kPa) | Temp °C. | Total H$_2$ Added Grams | Run Time Hrs | Polymer in Solution Wt. % | Melt Index | Total Wt % Styrene residue in Polymer | Talc Level Wt % | Isolation Method |
|---|---|---|---|---|---|---|---|---|---|---|---|---|---|---|
| A | 252 | 114 | 1320 | 599 | 42 | 290 | 60 | 0 | 2.8 | 11.5 | 0.18 | 81.7 | <2.5 | Stm. Str*. |
| C | 839 | 381 | 661 | 300 | 105 | 724 | 60 | 53.1 | 4.8 | 11.6 | 2.6 | 45.5 | 0 | Extruder |

TABLE 1A-continued

| Sample No. | Solvent loaded lbs | Solvent loaded kg | Styrene loaded lbs | Styrene loaded kg | Pressure Psig | Pressure kPa | Temp °C. | Total H$_2$ Added Grams | Run Time Hrs | Polymer in Solution Wt. % | Melt Index | Total Wt % Styrene residue in Polymer | Talc Level Wt % | Isolation Method |
|---|---|---|---|---|---|---|---|---|---|---|---|---|---|---|
| G | 842 | 382 | 662 | 300 | 105 | 724 | 60 | 8.8 | 3.7 | 8.6 | 0.01 | 48.3 | <1.0 | Stm. Str*. |
| H | 1196 | 542 | 225 | 102 | 70 | 483 | 60 | 7.5 | 6.1 | 7.2 | 0.03 | 29.8 | 0 | Extruder |
| I | 252 | 114 | 1320 | 599 | 40 | 276 | 60 | 23 | 6.5 | 18.0 | 1.8 | 81.6 | <2.0 | Stm.Str*. |

*Steam Stripped

Test parts and characterization data for the interpolymers and their blends are generated according to the following procedures:

Compression Molding: Samples are melted at 190° C. for 3 minutes and compression molded at 190° C. under 20,000 lb (9,072 kg) of pressure for another 2 minutes. Subsequently, the molten materials are quenched in a press equilibrated at room temperature.

Density: The density of the samples is measured according to ASTM-D792.

Differential Scanning Calorimetry (DSC): A Dupont DSC-2920 is used to measure the thermal transition temperatures and heat of transition for the interpolymers. In order to eliminate previous thermal history, samples are first heated to 200° C. Heating and cooling curves are recorded at 10° C./min. Melting (from second heat) and crystallization temperatures are recorded from the peak temperatures of the endotherm and exotherm, respectively.

Melt Shear Rheology: Oscillatory shear rheology measurements are performed with a Rheometrics RMS-800 rheometer. Rheological properties are monitored at an isothermal set temperature of 190° C. in a frequency sweep mode. η is viscosity. η(100/0.1) is the ratio of viscosities measured at 100 rad/sec and 0.1 rad/sec.

Mechanical Testing: Shore A hardness was measured at 23° C. following ASTM-D240. Flexural modulus is evaluated according to ASTM-D790. Tensile properties of the compression molded samples were measured using an INSTRON™ 1145 tensile machine (a registered trademark of the Instron Corporation, Canton, Mass.) equipped with an extensiometer, at 23° C. unless otherwise indicated. ASTM-D638 samples are tested at a strain rate of 5 min.$^{-1}$. The average of four tensile measurements is given. The yield stress and yield strain are recorded at the inflection point in the stress/strain curve. The Energy at break is the area under the stress/strain curve.

Tensile Stress Relaxation: Uniaxial tensile stress relaxation was evaluated using an INSTRON™ 1145 tensile machine (a registered trademark of the Instron Corporation, Canton, Mass.). Compression molded film (~20 mil, 0.5 mm thick) with a 1" gauge length was deformed to a strain level of 50% at a strain rate of 20 min.$^{-1}$. The force required to maintain 50% elongation was monitored for 10 min. The magnitude of the stress relaxation is defined as $(f_i-f_f/f_i)$ where $f_i$ is the initial force and $f_f$ is the final force.

Thermomechanical Analysis (TMA): Data were generated using a Perkin Elmer TMA 7 series instrument. Probe penetration is measured to 1 mm depth on 2 mm thick compression molded parts using a heating rate of 5° C./min and a load of 1 Newton.

TABLE 1B

Interpolymer blend components

| | (I) | (C) | (H) | (A) | (G) |
|---|---|---|---|---|---|
| | Composition | | | | |
| wt % atactic Polystyrene | 8.2 | 10.3 | 1 | 8.6 | 3.7 |
| wt % Styrene$^b$ | 69.9 | 43.4 | 29.3 | 69.4 | 47.3 |
| wt % Ethylene$^b$ | 30.1 | 56.6 | 70.7 | 30.6 | 52.7 |
| mol % Styrene$^b$ | 38.4 | 17.1 | 10 | 37.9 | 19.5 |
| mol % Ethylene$^b$ | 61.6 | 82.9 | 90 | 62.1 | 80.5 |
| | Molecular weight | | | | |
| MFR, I$_2$ | 1.83 | 2.62 | 0.03 | 0.18 | 0.01 |
| M$_n$ × 10$^{-3}$ | 71 | 66.8 | 118.1 | 161.1 | 144.9 |
| M$_w$/M$_n$ | 2.63 | 1.89 | 2.04 | 2.11 | 2.26 |
| | Physical Properties | | | | |
| Density, g/cc | 1.0175 | 0.9626 | 0.943 | 1.0352 | 0.9604 |
| Tm, ° C. | — | 49.6 | 71.3 | N.D.$^a$ | 45.7 |
| % Crystallinity | — | 4.8 | 14.7 | N.D.$^a$ | 4.7 |
| Tc, ° C. | — | 22.1 | 58.1 | N.D.$^a$ | 17.0 |
| Tg (DSC) | 24.7 | ~ −12 | −17.2 | 24.2 | −12.7 |
| | Mechanical Properties (23° C.) | | | | |
| Shore A | 98 | 75 | 88 | 96 | 76 |
| Tensile Modulus, MPa | 703.3 | 6.9 | 20 | 594.3 | 6.8 |
| Flexural Modulus, MPa | 620.6 | 69 | 62.1 | 617.1 | 141.3 |
| Yield Stress, MPa | 7.5 | 1.3 | 2.4 | N.D.$^a$ | N.D.$^a$ |
| % Strain @ Break | 248.3 | 475.3 | 377.5 | 257.8 | 337.8 |
| Stress @ Break, MPa | 17.1 | 22.6 | 34.3 | 21.5 | 17.5 |
| Energy @ Break, N · m | 98.2 | 102.2 | 145.5 | 118.5 | 73.2 |
| % Stress Relaxation (50%/10 min.) | 93.5 | 38 | 30.2 | 92.9 | 26.2 |
| | Melt Rheology | | | | |
| η × 10$^{-5}$ (0.1 rad/sec), Poise | 1.01 | 1.05 | 16.6 | 6.53 | 31 |
| η(100/0.1) | 0.14 | 0.15 | 0.16$^1$ | 0.048 | 0.038 |
| Tan δ (0.1 rad/sec) | 9.98 | 4.2 | 2.37 | 4.42 | 1.26 |

$^1$ratio of η(1.6)/η(0.1).
$^a$N.D. = not determined.
$^b$Amount of monomer residue in polymer chain.

EXAMPLES 1–3

Blends with Ethylene/α-Olefin Copolymers

Blend Preparation: Three blend compositions, examples 1, 2 and 3 are prepared from interpolymer (A) above and olefin polymer (B) in weight ratios of 75/25, 50/50 and 25/75 with a Haake mixer equipped with a Rheomix 3000 bowl. The blend components are first dry blended and then fed into the mixer equilibrated at 190° C. Feeding and temperature equilibration takes 3–5 minutes. The molten material is mixed at 190° C. and 40 rpm for 10 minutes.

The characterization data for these blends and the blend components which form the comparative experiments for these data are given in Table 2.

TABLE 2

| | Polymer | | EXAMPLE | | |
|---|---|---|---|---|---|
| | (A)[1]* | (B)[2]* | 1 | 2 | 3 |
| Blend Composition | | | | | |
| Wt. % Interpolymer (A) | 100 | 0 | 75 | 50 | 25 |
| Wt. % Olefinic Polymer (B) | 0 | 100 | 25 | 50 | 75 |
| Mechanical Properties (23° C.) | | | | | |
| Shore A Hardness | 96 | 74 | 96 | 91 | 81 |
| Tensile Modulus, MPa | 594.3 | 11 | 558.5 | 75.2 | 18.6 |
| Flexural Modulus, MPa | 617.1 | 34.5 | 327.5 | 82.1 | 47.6 |
| % Strain @ Break | 257.8 | 762.1 | 313.2 | 373.8 | 625.9 |
| Stress @ Break, MPa | 21.5 | 17.1 | 25.9 | 15.6 | 14.9 |
| Energy @ Break, N · m | 118.5 | 141 | 154.7 | 114.6 | 174.1 |
| % Stress Relaxation | 92.9 | 29.2 | 86.4 | 77.1 | 54.6 |
| Mechanical Properties (−10° C.) | | | | | |
| Tensile Modulus, MPa | — | 22.1 | 853.6 | 162.7 | 39.3 |
| % Strain @ Break | 18.6 | >577[3] | 182.1 | 279.9 | >581[3] |
| Stress @ Break, MPa | 19.8 | >15.8 | 35.8 | 28 | 30.7 |
| Energy @ Break, N · m | 9.6 | >118.0[3] | 150 | 143.2 | >260.4[3] |
| Melt Rheology (190° C.) | | | | | |
| $\eta \times 10^{-5}$ (0.1 rad/sec), Poise | 6.53 | 0.9 | 3.84 | 2.33 | 1.36 |
| $\eta$(100/0.1) | 0.048 | 0.2 | 0.063 | 0.099 | 0.15 |
| Tan δ (0.1 rad/sec) | 4.42 | 10.4 | 2.43 | 4.35 | 6.51 |

* Not an example of the present invention.
[1]Interpolymer A containing 69.4 wt. (38.4 mole) percent styrene; $I_2$ of 0.18.
[2]Olefin polymer (B) is ENGAGE ™ EG8100, an ethylene/octene copolymer commercially available from and a registered trademark of The Dow Chemical Company and having a density of 0.87 g/cm³ and a melt Index of 1.0 (190° C.; 2.16 kg).
[3]Sample slipped during testing.

Table 2 shows that the blend composition examples 1, 2 and 3 all have good mechanical integrity and strength performance as evidenced by the stress, strain and total energy at break. Of particular merit is the blend performance at −10° C., with high toughness being found. The stress and total energy at break unexpectedly exceeds or equals that of the component polymers (A) and (B).

Further, the blends all show unexpectedly high levels of stress relaxation compared to what would be anticipated from the component behavior and blend composition ratios. This property is desirable for many film applications.

The melt rheology data for the three blend examples show that the low shear tan δ (a measure of low shear melt elasticity) and viscosity is lower compared to what would be anticipated from the component behavior and blend composition ratios. This translates into improved processability in some applications.

EXAMPLES 4, 5 AND 6

Blends with Ethylene/α-Olefin Copolymers

Blend Preparation: Three blend compositions, examples 4, 5 and 6 are prepared from interpolymer (C) above and olefin polymer (B) in weight ratios of 75/25, 50/50 and 25/75 with a Haake mixer equipped ma with a Rheomix 3000 bowl. The blend components are first dry blended and then fed into the mixer equilibrated at 190° C. Feeding and temperature equilibration takes 3–5 minutes. The molten material is mixed at 190° C. and 40 rpm for 10 minutes.

The characterization data for these blends and the blend components which form the comparative examples for these experiments are given in Table 3.

TABLE 3

| | Polymer | | EXAMPLE | | |
|---|---|---|---|---|---|
| | (C)[1]* | (B)[2]* | 4 | 5 | 6 |
| Blend Composition | | | | | |
| Wt. % Interpolymer (C) | 100 | 0 | 75 | 50 | 25 |
| Wt. % Olefinic Polymer (B) | 0 | 100 | 25 | 50 | 75 |
| Mechanical Properties (23° C.) | | | | | |
| Shore A Hardness | 75 | 74 | 73 | 72 | 74 |
| Tensile Modulus, MPa | 6.9 | 11 | 8.3 | 9.7 | 11 |
| Flexural Modulus, MPa | 69 | 34.5 | 23.4 | 17.9 | 15.6 |
| % Strain @ Break | 475.3 | 762.1 | 503.7 | 546.5 | 691.7 |
| Stress @ Break, MPa | 22.5 | 17.1 | 26.9 | 21 | 24.5 |
| Energy @ Break, N · m | 102.2 | 141 | 102.4 | 108.9 | 146.9 |
| Mechanical Properties (−10° C.) | | | | | |
| Tensile Modulus, MPa | 12.1 | 22.1 | 20.3 | 12.9 | 6.1 |
| % Strain @ Break | 301.4 | >577[3] | 343.9 | 425.8 | >596 |
| Stress @ Break, MPa | 18.1 | >15.8[3] | 31.8 | 31.4 | 28.3 |
| Energy @ Break, N · m | 78.4 | >118.0[3] | 142.4 | 162.2 | >203.4[3] |
| Melt Rheology (190° C.) | | | | | |
| $\eta \times 10^5$ (0.1 rad/sec), Poise | 1.05 | 0.9 | 1.08 | 1.05 | 1.5 |
| $\eta$(100/0.1) | 0.15 | 0.2 | 0.14 | 0.14 | 0.1 |
| Tan δ (0.1 rad/sec) | 4.2 | 10.4 | 2.3 | 2.8 | 2.4 |

* Not an example of the present invention.
[1]Interpolymer (C) containing 43.4 wt. (17.1 mole) percent styrene; $I_2$ of 2.62.
[2]Olefin polymer (B) is ENGAGE ™ EG8100, an ethylene/octene copolymer commercially available from and a registered trademark of The Dow Chemical Company and having a density of 0.87 g/cm³ and a melt Index of 1.0 (190° C.; 2.16 kg).
[3]Sample slipped during testing.

Table 3 shows that the blend composition examples 4, 5 and 6 all have good mechanical integrity and strength performance as evidenced by the stress, strain and total energy at break. Of particular merit is the blend performance at −10° C., with high is toughness being found. The stress and total energy at break unexpectedly exceeds or equals that of the component polymers.

The melt rheology data for the three blend examples show, in particular, that the low shear tan δ (a measure of low shear melt elasticity) is lower compared to what would be anticipated from the component behavior and blend composition ratios. This translates into improved processability in some applications, compared to the component polymers.

EXAMPLE 7

Blend with Ethylene/α-Olefin Copolymer

Blend Preparation: A blend composition, example 7, is prepared from interpolymer (A) above and olefin polymer (D) in a weight ratio of 50/50 with a Haake mixer equipped with a Rheomix 3000 bowl. The blend components are first dry blended and then fed into the mixer equilibrated at 190° C. Feeding and temperature equilibration takes 3–5 minutes. The molten material is mixed at 190° C. and 40 rpm for 10 minutes.

The characterization data for the blend and the blend components which form the comparative examples for these experiments are given in Table 4.

TABLE 4

| | Polymer | | Example |
|---|---|---|---|
| | (A) *1 | (D) *2 | 7 |
| Blend Composition | | | |
| Wt. % Interpolymer (A) | 100 | 0 | 50 |
| Wt. % Olefinic Polymer (B) | 0 | 100 | 50 |
| Mechanical Properties (23° C.) | | | |
| Shore A | 96 | 68 | 87 |
| Tensile Modulus, MPa | 594.3 | 6.2 | 119.3 |
| Flexural Modulus, MPa | 617.1 | 23.4 | 105.5 |
| % Strain @ Break | 257.8 | 810.1 | 365.2 |
| Stress @ Break, MPa | 21.5 | 14.4 | 15.3 |
| Energy @ Break, N.m | 118.5 | 124.1 | 118.5 |
| % Stress Relaxation | 92.9 | 27.5 | 79.2 |
| Mechanical Properties (−10° C.) | | | |
| Tensile Modulus, MPa | — | — | 126.9 |
| % Strain @ Break | 18.6 | — | 278.9 |
| Stress @ Break, MPa | 19.8 | — | 28.1 |
| Energy @ Break N.m | 9.6 | — | 136.8 |
| Melt Rheology (190° C.) | | | |
| $\eta \times 10^5$ (0.1 rad/sec), Poise | 6.53 | 1.67 | 2.55 |
| $\eta(100/0.1)$ | 0.048 | 0.13 | 0.087 |
| Tan δ (0.1 rad/sec) | 4.42 | 6.04 | 3.34 |

* Not an example of the present invention
[1]Interpolymer (A) is an ethylene/styrene interpolymer containing 69.4 wt. (37.9 mole) percent styrene; $I_2$ of 0.18.
[2]Olefin polymer (D) is ENGAGE ™ EG8100, an ethylene/octene copolymer commercially available from and a registered trademark of The Dow Chemical Company and having a density of 0.87 g/cm³ and a melt Index of 1.0 (190° C.; 2.16 kg).

Table 4 shows that the blend composition example has good mechanical integrity and strength performance as evidenced by the stress, strain and total energy at break. Of particular merit is the blend performance at −10° C., with high toughness being found compared to the unmodified Interpolymer (A).

The blend shows an unexpectedly high level of stress relaxation compared to what would be anticipated from the component behavior and blend composition ratio. This property is desirable for many film applications.

The melt rheology data for the blend example shows that the low shear viscosity and tan δ (a measure of low shear melt elasticity) is lower compared to either component. This translates into improved processability in some applications, compared to the component polymers.

EXAMPLE 8

Blend with Ethylene/α-Olefin Copolymer

Blend Preparation: A blend composition, example 8, is prepared from interpolymer (C) above and olefin polymer (E) in a weight ratio is of 50/50 with a Haake mixer equipped with a Rheomix 3000 bowl. The blend components are first dry blended and then fed into the mixer equilibrated at 190° C. Feeding and temperature equilibration takes 3–5 minutes. The molten material is mixed at 190° C. and 40 rpm for 10 minutes.

The characterization data for the blend and the blend components which form the comparative examples for these experiments are given in Table 5.

TABLE 5

| | Polymer | | Example |
|---|---|---|---|
| | (C) *1 | (E) *2 | 8 |
| Blend Composition | | | |
| Wt. % Interpolymer (C) | 100 | 0 | 50 |
| Wt. % Olefinic Polymer (E) | 0 | 100 | 50 |
| Mechanical Properties (23° C.) | | | |
| Shore A | 75 | 89 | 86 |
| Tensile Modulus, MPa | 6.9 | 76.5 | 29.6 |
| Flexural Modulus, MPa | 69 | 129.6 | 105.5 |
| % Strain @ Break | 475.3 | 643.3 | 551.1 |
| Stress @ Break, MPa | 22.5 | 35.6 | 32 |
| Energy @ Break, N.m | 102.2 | 289.5 | 183.7 |
| Melt Rheology (190° C.) | | | |
| $\eta \times 10^{-5}$ (0.1 rad/sec), Poise | 1.05 | 1.19 | — |
| $\eta(100/0.1)$ | 0.15 | 0.13 | — |
| Tan δ (0.1 rad/sec) | 4.2 | 5.12 | — |

* Not an example of the present invention
[1]Interpolymer (C) is an ethylene/styrene interpolymer containing 43.4 wt. (17.1 mole) percent styrene; $I_2$ of 2.62.
[2]Olefin polymer (E) is AFFINITY ™ PL1880, an ethylene/octene copolymer commercially available from and a registered trademark of The Dow Chemical Company and having a density of 0.903 g/cm3 and a melt Index of 1.0 (190° C.; 2.16 kg).

Table 5 shows that the blend composition example has good mechanical integrity and strength performance as evidenced by the stress, strain and total energy at break.

EXAMPLES 9, 10 AND 11

Blends with Ultra-Low Molecular Weight Ethylene/ α Olefin Copolymer

Preparation of Olefin Polymer F

Catalyst Preparation

Part 1: Preparation of $TiCl_3(DME)_{1.5}$

The apparatus (referred to as R-1) is set-up in the hood and purged with nitrogen; it consisted of a 10 L glass kettle with flush mounted bottom valve, 5-neck head, polytetrafluoroethylene gasket, clamp, and stirrer components (bearing, shaft, and paddle). The necks are equipped as follows: stirrer components are put on the center neck, and the outer necks had a reflux condenser topped with gas inlet/outlet, an inlet for solvent, a thermocouple, and a stopper. Dry, deoxygenated dimethoxyethane (DME) is added to the flask (approx. 5 L). In the drybox, 700 g of $TiCl_3$ is weighed into an equalizing powder addition funnel; the funnel is capped, removed from the drybox, and put on the reaction kettle in place of the stopper. The $TiCl_3$ is added over 10 minutes with stirring. After the addition is completed, additional DME is used to wash the rest of the $TiCl_3$ into the flask. The addition funnel is replaced with a stopper, and the mixture heated to reflux. The color changed from purple to pale blue. The mixture is heated for 5 hours, cooled to room temperature, the solid is allowed to settle, and the supernatant is decanted from the solid. The $TiCl_3$ $(DME)_{1.5}$ is left in R-1 as a pale blue solid.

Part 2: Preparation of $[(Me_4C_5)SiMe_2N-t-Bu][MgCl]_2$

The apparatus (referred to as R-2) is set-up as described for R-1, except that flask size is 30 L. The head is equipped with seven necks; stirrer in the center neck, and the outer necks containing condenser topped with nitrogen inlet/outlet, vacuum adapter, reagent addition tube, thermocouple, and stoppers. The flask is loaded with 4.5 L of toluene, 1.14 kg of $(Me_4C_5H)SiMe_2NH-t-Bu$, and 3.46 kg of 2 M i-PrMgCl in $Et_2O$. The mixture is then heated, and the ether allowed to boil off into a trap cooled to −78° C. After four hours, the temperature of the mixture had reached 75° C. At the end of this time, the heater is turned off and DME is added to the hot, stirring solution, resulting in the formation of a white solid. The solution is allowed to cool to room temperature, the material is allowed to settle, and the supernatant is decanted from the solid. The [(Me$_4$C$_5$)SiMe$_2$N-t-Bu][MgCl]$_2$ is left in R-2 as an off-white solid.

Part 3: Preparation of [($\eta^5$-Me$_4$C$_5$)SiMe$_2$N-t-Bu]TiMe$_2$

The materials in R-1 and R-2 are slurried in DME (3 L of DME in R-1 and 5 L in R-2). The contents of R-1 are transferred to R-2 using a transfer tube connected to the bottom valve of the 10 L flask and one of the head openings in the 30 L flask. The remaining material in R-1 is washed over using additional DME. The mixture darkened quickly to a deep red/brown color, and the temperature in R-2 rose from 21° C. to 32° C. After 20 minutes, 160 mL of CH$_2$Cl$_2$ is added through a dropping funnel, resulting in a color change to green/brown. This is followed by the addition of 3.46 kg of 3 M MeMgCl in THF, which caused a temperature increase from 22° C. to 52° C. The mixture is stirred for 30 minutes, then 6 L of solvent is removed under vacuum. Isopar E (6 L) is added to the flask. This vacuum/solvent addition cycle is repeated, with 4 L of solvent removed and 5 L of Isopar E added. In the final vacuum step, an additional 1.2 L of solvent is removed. The material is allowed to settle overnight, then the liquid layer decanted into another 30 L glass kettle (R-3). The solvent in R-3 is removed under vacuum to leave a brown solid, which is re-extracted with Isopar E; this material is transferred into a storage cylinder. Analysis indicated that the solution (17.23 L) is 0.1534 M in titanium; this is equal to 2.644 moles of [($\eta^5$-Me$_4$C$_5$)SiMe$_2$N-t-Bu]TiMe$_2$. The remaining solids in R-2 are further extracted with Isopar E, the solution is transferred to R-3, then dried under vacuum and re-extracted with Isopar E. This solution is transferred to storage bottles; analysis indicated a concentration of 0.1403 M titanium and a volume of 4.3 L (0.6032 moles [($\eta^5$-Me$_4$C$_5$)SiMe$_2$N-t-Bu]TiMe$_2$). This gives an overall yield of 3.2469 moles of [($\eta^5$-Me$_4$C$_5$)SiMe$_2$N-t-Bu]TiMe$_2$, or 1063 g. This is a 72% yield overall based on the titanium added as TiCl$_3$.

Polymer Preparation

The polymer is produced in a solution polymerization process using a continuously stirred reactor. The polymer is stabilized with 1,250 ppm calcium stearate, 500 ppm Irganox™ 1076 hindered polyphenol stabilizer (available from and a registered trademark of Ciba-Geigy Corporation), and 800 ppm PEPQ™ (tetrakis(2,4-di-t-butylphenyl)-4,4′-biphenylene diphosphonite) (available from and a registered trademark of Clariant Corporation).

The feed mixture of ethylene (2 lb/hr, 0.91 kg/hr) and the hydrogen (0.48 mole % ratio to ethylene) are combined into one stream before being introduced into the diluent mixture, a mixture of C$_8$–C$_{10}$ saturated hydrocarbons, e.g., Isopar™-E hydrocarbon mixture (available from and a registered trademark of Exxon Chemical Company)employed in a wt. ratio to ethylene of 11.10:1; and the octene comonomer at a mole ratio to ethylene of 12.50:1 is continuously injected into the reactor.

The metal complex at 4 ppm and 0.428 lb/hr (0.194 kg/hr) and cocatalysts at 88 ppm and 0.460 lb/hr (0.209 kg/hr) are combined into a single stream and are also continuously injected into the reactor. The aluminum concentration is 10 ppm at a flow rate of 0.438 lb/hr (0.199 kg/hr).

Sufficient residence time is allowed for the metal complex and cocatalyst to react prior to introduction into the polymerization reactor. The reactor pressure is held constant at 475 psig. Ethylene content of the reactor, after reaching steady state, is maintained at the conditions specified. The reactor temperature is 110° C. The ethylene concentration in the exit stream is 1.69 wt. Percent.

After polymerization, the reactor exit stream is introduced into a separator where the molten polymer is separated from the unreacted comonomer(s), unreacted ethylene, unreacted hydrogen, and diluent mixture stream. The molten polymer is subsequently strand chopped or pelletized, and, after being cooled in a water bath or pelletizer, the solid pellets are collected. The resultant polymer is an ultra low molecular weight ethylene/octene copolymer having a density of 0.871 g/cm$^3$, melt viscosity of 4,200 centipoise (4.2 Pa.s) at 350° F. (176.7° C.), and number average molecular weight (Mn) of 9,100 and Mw/Mn of 1.81.

Blend Preparation: Three blend compositions, examples 9, 10 and 11 are prepared from interpolymers (A), (G) and (H) above and olefin polymer (F) all in a weight ratio of 90/10 Interpolymer/olefin polymer with a Haake mixer equipped with a Rheomix 3000 bowl. The blend components are first dry blended and then fed into the mixer equilibrated at 190° C. Feeding and temperature equilibration takes 3–5 minutes. The molten material is mixed at 190° C. and 40 rpm for 10 minutes.

The characterization data for these blends and the blend components which form the comparative examples for these experiments are given in Table 6.

TABLE 6

|  | Polymer |  | Ex. | Polym | Ex. | Polym | Ex. |
|---|---|---|---|---|---|---|---|
|  | (A)*[1] | (F)*[2] | 9 | (G)*[3] | 10 | (H)*[4] | 11 |
| Blend Composition |  |  |  |  |  |  |  |
| Wt. % Interpolymer (A) | 100 | 0 | 90 | 0 | 0 | 0 | 0 |
| Wt. % Interpolymer (G) | 0 | 100 | 0 | 100 | 90 | 0 | 0 |
| Wt. % Interpolymer (H) | 0 | 0 | 0 | 0 | 0 | 100 | 90 |
| Wt. % Olefinic Polymer F | 0 | 0 | 10 | 0 | 10 | 0 | 10 |
| Mechanical Properties (23° C.) |  |  |  |  |  |  |  |
| Shore A Hardness | 96 | — | 97 | 76 | 72 | 88 | 84 |
| Tensile Mod, MPa | 594.3 | 7.55 | 105.7 | 6.8 | 7.6 | 20 | 20.7 |
| Flexural Mod, MPa | 617.1 | — | 111 | 141.3 | 33.1 | 62.1 | 53.1 |
| % Strain @ Break | 257.8 | <75 | 254.2 | 337.8 | 515.9 | 377.5 | 341.7 |
| Stress @ Break, MPa | 21.5 | <1.5 | 22.9 | 17.5 | 18 | 34.3 | 16.9 |
| Energy @ Break, N · m | 118.5 | — | 111.1 | 73.2 | 94 | 145.5 | 92.6 |
| % Stress Relaxation (50%/10 min) | 92.9 | — | 90 | 26.2 | 35.9 | 30.2 | 30.9 |

TABLE 6-continued

|  | Polymer | Ex. | Polym | Ex. | Polym | Ex. |
|---|---|---|---|---|---|---|
|  | (A)*1 (F)*2 | 9 | (G)*3 | 10 | (H)*4 | 11 |
| Melt Rheology (190° C.) | | | | | | |
| η × 10$^5$ (0.1 rad/sec), poise | 6.53 — | 5.3 | 31 | 0.92 | 16.6 | 11 |
| η(100/0.1) | 0.048 — | 0.046 | 0.038 | 0.09 | 0.16 | 0.046 |
| Tan δ (0.1 rad/sec) | 4.42 — | 3.74 | 1.26 | 3.12 | 2.37 | 2.17 |

* Not an example of the present invention.
[1]Interpolymer (A) containing 69.9 wt. (40 mole) percent styrene; I$_2$ of 1.83.
[2]Olefin polymer (F) is an ultra low molecular weight ethylene/1-octene copolymer having a density of 0.871 g/cm$^3$, melt viscosity of 4,200 centipoise (4.2 Pa · s) at 350° F. (176.7° C.), number average molecular weight (Mn) of 9,100 and Mw/Mn of 1.81.
[3]Interpolymer (G) containing 47.3 wt. (19.5 mole) percent styrene; I$_2$ of 0.01.
[4]Interpolymer (H) containing 29.3 wt. (10 mole) percent styrene; I$_2$ of 0.03.

First, this low molecular weight olefin polymer(F) has little mechanical strength compared to a high molecular weight analogue. Table 6 shows that the blend composition examples retain the good mechanical integrity and strength performance of the component polymers as evidenced by the stress, strain and total energy at break.

The blend shows an unexpectedly high level of stress relaxation compared to what would be anticipated from the component behavior and blend composition ratio. This property is desirable for many film applications. The melt rheology data for the blend examples show that the low shear viscosity and tan δ (a measure of low shear melt elasticity) can be altered by incorporation of olefin polymer (F). This translates into improved processability in some applications, compared to the component polymer, but with retention of desirable mechanical performance.

EXAMPLES 12 AND 13

Blends with Chlorinated Polyethylene(CPE)

Blend Preparation: Two blend compositions, examples 12 and 13 are prepared from interpolymers (I) and (C) and olefin polymer (J) both in a weight ratio of 50/50 with a Haake mixer equipped with a Rheomix 3000 bowl. The blend components are first dry blended and then fed into the mixer equilibrated at 190° C. Feeding and temperature equilibration takes 3–5 minutes. The molten material is mixed at 190° C. and 40 rpm for 10 minutes.

The characterization data for these two blends and the blend components which form the comparative examples for these experiments are given in Table 7.

TABLE 7

|  | Polymer | | Ex. | Poly. | Ex. |
|---|---|---|---|---|---|
|  | (I)*1 | (J)*2 | 12 | (C)*3 | 13 |
| Blend Composition | | | | | |
| Interpolymer (C) | 0 | 0 | 0 | 100 | 50 |
| Interpolymer (I) | 100 | 0 | 50 | 0 | 0 |
| Olefin Polymer (J) | 0 | 100 | 50 | 0 | 50 |

TABLE 7-continued

|  | Polymer | | Ex. | Poly. | Ex. |
|---|---|---|---|---|---|
|  | (I)*1 | (J)*2 | 12 | (C)*3 | 13 |
| Mechanical Properties (23° C.) | | | | | |
| Tensile Modulus, MPa | 703.3 | 28.2 | 206.4 | 6.6 | 11.9 |
| % Strain @ Break | 248.3 | 370.2 | 319.9 | 475.3 | 566.1 |
| Stress @ Break, MPa | 17.1 | 6 | 14.2 | 22.5 | 12 |
| Energy @ Break, N · m | 98.2 | 41.4 | 75.1 | 102.2 | 77.6 |
| Melt Rheology (190° C.) | | | | | |
| η × 10$^{-5}$ (0.1 rad/sec), poise | 1.01 | — | 5.3 | 1.05 | 0.92 |
| η(100/0.1) | 0.14 | 9.98 | 0.046 | 0.15 | 0.09 |
| Tan δ (0.1 rad/sec) | 9.98 | — | 3.74 | 4.2 | 3.12 |

* Not an example of the present invention.
[1]Interpolymer (C) containing 43.3 wt. (17.1 mole) percent styrene; I$_2$ of 2.62.
[2]Olefin polymer (J) is chlorinated polyethylene (CPE) commercially available from and a registered trademark of The Dow Chemical Company as TYRIN ™ 4211P, and having a chlorine content of 42%, a density of 1.22 g/cm$^3$ and <2% residual crystallinity as measured by heat of fusion.
[3]Interpolymer (I) containing 69.9 wt. (38.4 mole) percent styrene; I$_2$ of 1.83.

Table 7 shows that the blend composition examples have good mechanical integrity and strength performance as evidenced by the stress, strain and total energy at break.

EXAMPLES 14 TO 22

Blends with Polypropylene and Propylene Copolymers

Blend Preparation: All blend compositions are prepared with a Haake mixer equipped with a Rheomix 3000 bowl. The blend components are first dry blended in the ratios given in Table 8 and then fed into the mixer equilibrated at 190° C. Feeding and temperature equilibration takes 3–5 minutes. The molten material is mixed at 190° C. and 40 rpm for 10 minutes.

The characterization data for the blends and the blend components which form the comparative examples for these experiments are given in Table 8.

TABLE 8

|  | Poly. (G)*1 | Poly. (I)*2 | Poly. K*3 | Ex. 14 | Ex. 15 | Poly. (G)*1 | Poly. (I)*2 | Poly. L3 | Ex. 16 | Ex. 17 | Ex. 18 |
|---|---|---|---|---|---|---|---|---|---|---|---|
| Blend Composition | | | | | | | | | | | |
| Interpolymer (G) | 100 | 0 | 0 | 0 | 50 | 100 | 0 | 0 | 0 | 0 | 50 |
| Interpolymer (I) | 0 | 100 | 0 | 70 | 0 | 0 | 100 | 0 | 70 | 50 | 0 |
| Olefinic Polymer K | 0 | 0 | 100 | 30 | 50 | 0 | 0 | 100 | 30 | 50 | 50 |
| Mechanical Properties (23° C.) | | | | | | | | | | | |
| Tensile Mod, MPa | 6.8 | 703.3 | 1,203.2 | 1,463.1 | 3,055.9 | | | 111 | 542.6 | 410.3 | 62.1 |
| % Strain @ Break | 337.8 | 248.3 | 1.7 | 125.3 | 2 | | | 693 | 249.7 | 23.6 | 390.2 |
| Stress @ Break, MPa | 17.5 | 17.1 | 11.3 | 13.7 | 18.2 | | | 6.7 | 14.1 | 9.5 | 10.8 |
| Energy @ Break, N · m | 73.2 | 98.2 | 0.5 | 63.9 | 1.1 | | | 120.8 | 96.8 | 7.7 | 114.4 |
| TMA4, ° C. | — | 66 | 164 | 114 | 162 | — | 66 | 139 | 78 | 126 | 129 |
| Melt Rheology (190° C.) | | | | | | | | | | | |
| η × 10−5 (0.1 rad/sec), poise | 31 | 1.01 | 0.62 | 0.87 | 0.79 | | | 0.88 | 0.95 | 0.87 | 8.45 |
| η(100/0.1) | 0.038 | 0.14 | 0.052 | 0.1 | 0.071 | | | 0.062 | 0.1 | 0.091 | 0.018 |
| Tan δ (0.1 rad/sec) | 1.26 | 9.98 | 3.06 | 3.5 | 3.89 | | | 3.26 | 3.08 | 3.67 | 0.75 |

|  | Poly. (G)*1 | Poly. (I)*2 | Poly. (M)*3 | Ex. 19 | Ex. 20 | Poly. (N)*4 | Ex. 21 | Ex. 22 |
|---|---|---|---|---|---|---|---|---|
| Blend Composition | | | | | | | | |
| Interpolymer (G) | 100 | 0 | 0 | 0 | 50 | 0 | 0 | 50 |
| Interpolymer (I) | 0 | 100 | 0 | 70 | 0 | 0 | 50 | 0 |
| Olefinic Polymer (M) | 0 | 0 | 100 | 30 | 50 | 0 | 0 | 0 |
| Olefinic Polymer (N) | 0 | 0 | 0 | 0 | 0 | 100 | 50 | 50 |
| Mechanical Properties (23° C.) | | | | | | | | |
| Tensile Mod, MPa | 6.8 | 703.3 | 20 | 406.8 | 11.7 | 2 | 84.8 | 3.5 |
| % Strain @ Break | 337.8 | 248.3 | 717.3 | 309 | 327.5 | 181.8 | 29.7 | 284.7 |
| Stress @ Break, MPa | 17.5 | 17.1 | 8.3 | 16 | 5.5 | 0.2 | 2.2 | 2.3 |
| Energy @ Break, N · m | 73.2 | 98.2 | 105.1 | 112.3 | 43.8 | 1.8 | 2.6 | 14.4 |
| Melt Rheology (190° C.) | | | | | | | | |
| η × 10−5 (0.1 rad/sec), poise | 31 | 1.01 | 0.9 | 1.03 | 3 | 1.77 | 1.3 | 6.11 |
| η(100/0.1) | 0.038 | 0.14 | 0.19 | 0.13 | 0.057 | 0.14 | 0.13 | 0.031 |
| Tan δ (0.1 rad/sec) | 1.26 | 9.98 | 7.11 | 3.12 | 1.7 | 4.83 | 3.68 | 0.94 |

\* Not an example of the present invention.
[1] Interpolymer (G) containing 47.3 wt. (19.5 mole) percent styrene; $I_2$ of 0.01.
[2] Interpolymer (I) containing 69.9 wt. (38.4 mole) percent styrene; $I_2$ of 1.83.
[3] Olefin polymer (M) is an ethylene-propylene copolymer containing 76% Ethylene/24% Propylene, produced via INSITE ™ catalyst technology (a registered trademark of the Dow Chemical Co.) and having a melt index ($I_2$) of 1.37.
[4] Olefin polymer (N) is an ethylene-propylene-diene terpolymer containing 50.9% Ethylene/44.9% Propylene/4.2% norbornene, produced via INSITE ™ catalyst technology (a registered trademark of the Dow Chemical Co.) and having a melt index ($I_2$) of 0.56.

Table 8 shows that blend compositions show good mechanical integrity and strength performance as evidenced by the stress, strain and total energy at break.

EXAMPLES 23, 24 AND 25

Blends with Ethylene/Vinyl Acetate Copolymer
Blend Preparation

Three blend compositions, examples 23, 24 and 25, are prepared in a weight ratios of 50/50 from interpolymer (H) and olefin polymer (O), Elvax™ 250, (a registered trademark of Du Pont) a weight ratio of 50/50 from interpolymer (G) and olefin polymer (O), and a weight ratio of 50/50 from interpolymer (A) and olefin polymer (O), with a Haake mixer equipped with a Rheomix 3000 bowl. The blend components are first dry blended and then fed into the mixer equilibrated at 190° C. Feeding and temperature equilibration takes 3–5 minutes. The molten material is mixed at 190° C. and 40 rpm for 10 minutes.

The characterization data for these blends and the blend components which form the comparative experiments are given in Table 9.

TABLE 9

| Example | Poly. (H)2 | Poly. (O)4 | Ex. 23 | Poly. (G)2 | Ex. 24 | Poly. (A)1 | Ex. 25 |
|---|---|---|---|---|---|---|---|
| Blend Composition. Wt. ratio | | (H)/(O) 50/50 | | (G)/(O) 50/50 | | (A)/(O):50/50 | |

TABLE 9-continued

| Example | Poly. (H)[2] | Poly. (O)[4] | Ex. 23 | Poly. (G)[2] | Ex. 24 | Poly. (A)[1] | Ex. 25 |
|---|---|---|---|---|---|---|---|
| | | | Mechanical properties (23° C.) | | | | |
| Tensile Mod, MPa | 20 | 14.5 | 19.3 | 6.8 | 10.3 | 594.3 | 93.8 |
| % Strain @ Break | 377.5 | 1019 | 465 | 337.8 | 577 | 257.8 | 297 |
| Stress @ Break, MPa | 34.3 | 11 | 13.9 | 17.5 | 7.4 | 21.5 | 11.3 |
| Energy @ Break, N · m | 145.5 | 146.5 | 78.6 | 73.2 | 61 | 118.5 | 55.6 |
| | | | Melt Rheology (@ 190° C.) | | | | |
| $\eta\ 10^{-5}$ (0.1 rad/sec), poise | 16.6 | 0.5 | 3.3 | 31 | 0.23 | 6.53 | 0.87 |
| $\eta(100/0.1)$ | — | 0.38 | 0.052 | 0.038 | 0.14 | 0.048 | 0.076 |
| Tan δ (0.1 rad/sec) | 2.37 | 48.3 | 2.03 | 1.26 | 3.9 | 4.42 | 5.2 |

[1] Interpolymer (A) containing 69.4 wt. (38.4 mole) percent styrene; $I_2$ of 0.18.
[2] Interpolymer (G) containing 47.3 wt. (19.5 mole) percent styrene; $I_2$ of 0.01.
[3] Interpolymer (H) containing 29.3 wt. (10 mole) percent styrene; $I_2$ of 0.03.
[4] Polymer (O) is an ethylene/vinyl acetate copolymer, Elvax ™ 250 available from and a registered trademark of the DuPont chemical company.

Table 9 shows that the blend composition examples have good mechanical integrity and strength performance as evidenced by the stress, strain and total energy at break.

The melt rheology data for the blend examples show that the low shear viscosity and tan δ (a measure of low shear melt elasticity) can be unexpectedly altered by incorporation of the interpolymers. This translates into improved processability in some applications, compared to the component polymer, but with retention of desirable mechanical performance.

EXAMPLE 26

LDPE Polymer

The LDPE polymer used in this example has a melt index of 1.8 per ASTM 1238, at 190° C./2.16 kg and a density of 0.923 g/cm³.

ES Interpolymer

The ES interpolymer employed in this example is interpolymer I (see tables 1A and 1B).

The resultant interpolymer contains 69.9 wt. percent (38.4 mol percent) styrene moiety (residue) and a melt index $(I)_2$ of 1.83.

The equipment used in this example is a 38 mm (1½") screw type extruder having additional zones of mixing and cooling at the end of usual sequential zones of feeding, metering, and mixing. An opening for blowing agent is provided on the extruder barrel between the metering and mixing zones. At the end of the cooling zone, there is attached a die orifice having an opening of rectangular shape. The height of the opening, hereinafter called the die gap, is adjustable while its width is fixed at 6.35 mm (0.25")

In this example, 80/20 and 60/40 blends of a low density polyethylene (LDPE) and an ES copolymer are expanded with isobutane blowing agent. For comparison, a foam is also prepared from the straight LDPE resin.

The granular polyethylene is preblended with a predetermined amount of the granular ES copolymer, a concentrate of glycerol monostearate (GMS) so that the effective GMS level could be 1.0 pph, and a small amount (approximately 0.02 pph) of talcum powder. GMS is added for foam dimensional stability and talcum powder is added for cell size control. The solid mixture is then fed into the hopper of the extruder and extruded at a uniform rate of 15 lb/hr) (6.8 kg/hr). The temperatures maintained at the extruder zones are 160° C. at feeding zone, 177° C. at transition zone, 188° C. at melting zone, 193° C. at metering zone and 177° C. at mixing zone. Isobutane is injected into the injection port at a uniform rate so that the blowing agent level became approximately 1.3 g-moles per kilogram of polymer (mpk). The temperature of the cooling zone is gradually reduced to cool the polymer/blowing agent mixture (gel) to the optimum foaming temperature. The optimum foaming temperature ranged from 108° C. to 111° C. The die temperature is maintained at 108–109° C. throughout the tests in this example. The die opening is adjusted to achieve a good foam strand free from prefoaming.

Processability and Strength Testing

The processability data of the tests are summarized in Table 10. Good foams having low densities and substantially closed-cell structure are achieved from the polymer bends as well as from the LDPE resin. The blends permit greater die openings and thus larger is foam cross-sectional sizes. All foams have a width of approximately 32 mm. The foams are dimensionally stable during aging at a room temperature while exhibiting little shrinkage. The strength properties of the foams are tested approximately one month after extrusion. As shown in Table 10, the foams made from LDPE/ES blends are stronger and tougher than the LDPE foam in both tensile and compression tests.

TABLE 10

Processability and Strength Properties of Blend Foams

| Test No. | Polymer Type (1) | Die Gap (mm) (2) | Thick. (mm) (3) | Foam Dens. (kg/m³) (4) | Cell Size (mm) (5) | Tens. Str. (kPa) (6) | Tens. Elong. (%) (7) | Comp. Str. (kPa) (8) |
|---|---|---|---|---|---|---|---|---|
| 1.1* | LDPE | 1.5 | 11 | 30 | 1.8 | 193 | 58 | 40 |
| 1.2 | LDPE/ES 80/20 | 1.8 | 15 | 35 | 1.5 | 200 | 71 | 53 |
| 1.3 | LDPE/ES 60/40 | 2.4 | 17 | 36 | 1.1 | 214 | 134 | 68 |

* Not an example of this invention.
(1) ES = ethylene/styrene copolymer I having 69.9% styrene residue and a melt index ($I_2$) of 1.83.
(2) The height of die opening at the threshold of prefoaming in millimeters.
(3) The thickness of foam body in millimeters.
(4) The density of foam body aged for 4 weeks in kilograms per cubic meter.
(5) The cell size determined per ASTM D3576 in millimeters.
(6) Tensile strength of the foam body in the extrusion direction in kilopascals.
(7) Tensile elongation of the foam body in the extrusion direction in percent.
(9) Compressive strength of the foam body at 25% deflection determined per ASTM D3575 in kilopascals.

Damping Characteristics

The foams prepared above are tested for their damping characteristics. The test specimens are prepared from foam strands made above by cutting them into strips of approximately 12.7 mm in width, 4.5 mm in thickness and 51 mm in length. The damping tests are conducted on a dynamic mechanical spectrometer operated in a oscillatory torsional mode. In practice, a specimen is mounted on a torsional test jig so that the length between the clamps could be approximately 45 mm. At an ambient temperature of approximately 25° C., the specimen is twisted to approximately 0.5% strain in a back-and-forth oscillatory motion at a speed of one radian per second at the start. The speed of oscillation is gradually increased until it reached 100 radians per second where the test is terminated. During the frequency scan, there are recorded the storage modulus (G'), the loss modulus (G"), tan δ and the damping coefficient (C). The latter two properties are related to the former properties and the oscillating speed by the following equations:

$$\tan\delta = \frac{G''}{G'} \quad (1)$$

$$C = \frac{G''}{\omega} \quad (2)$$

$$\omega = 2\pi f \quad (3)$$

where, ω is the angular speed in radians per second and f, the frequency in Hertz (Hz).

Two specimens are tested per each foam. In Table 11, the excerpted data at one Hz and 10 Hz are presented. The data are the average of values for two runs. In addition, the damping coefficients for the entire range of frequency are shown in Table 12. It is evident from the table that the LDPE/ES blend foams are superior to the LDPE foam in damping or energy-absorbing capabilities. That is, the foams have greater G', G", tan δ, and C than the control LDPE foam. The enhancement of the energy-absorbing capability with the level of the ES copolymer is also evident. The 60/40: LDPE/ES blend foam is remarkable with its five fold better damping capability than the LDPE foam.

TABLE 11

Damping Characteristics for Various Acoustical Blend Foams

| | | 1 Hz (6.3 rad/sec) | | | | 10 Hz (63 rad/sec) | | | |
|---|---|---|---|---|---|---|---|---|---|
| Test No. | Polymer Type | G' (1) | G" (2) | Tan δ (3) | C (4) | G' (1) | G" (2) | Tan δ (3) | C (4) |
| 1.1* | LDPE | 40 | 6 | 0.14 | 0.9 | 46 | 6 | 0.13 | 0.1 |
| 1.2 | LDPE/ES 80/20 | 63 | 12 | 0.19 | 1.9 | 78 | 12 | 0.15 | 0.2 |
| 1.3 | LDPE/ES 60/40 | 85 | 30 | 0.35 | 4.7 | 30 | 31 | 0.24 | 0.5 |

* Not an example of this invention
(1) Storage modulus in $E^{+9}$ dyne per square centimeter.
(2) Loss modulus in $E^{+9}$ dyne per square centimeter.
(3) tan delta = G"/G'.
(4) Damping coefficient in $E^{+9}$ dyne per square centimeter/radians per second.

TABLE 12

Effect of Frequency on Damping Coefficients of Various Acoustical Blend Foams in Torsional DMS Test

| | | | Damping Coefficient $E^{+9}$ dyne sec/cm² | | |
|---|---|---|---|---|---|
| Test No. | Frequency Hz | Ang. Vel. rad/s | LDPE | LDPE/ES 80/20 | LDPE/ES 60/40 |
| a | 0.16 | 1.00 | 5.43 | 11.60 | 21.65 |
| b | 0.20 | 1.26 | 4.41 | 9.37 | 18.25 |
| c | 0.25 | 1.59 | 3.58 | 7.55 | 15.4 |
| d | 0.32 | 2.00 | 2.8 | 6.10 | 12.85 |
| e | 0.40 | 2.51 | 2.32 | 4.86 | 10.75 |
| f | 0.50 | 3.16 | 1.81 | 3.70 | 8.82 |
| g | 0.63 | 3.98 | 1.42 | 3.04 | 7.24 |
| h | 0.80 | 5.01 | 1.12 | 2.48 | 5.84 |
| i | 1.00 | 6.31 | 0.90 | 1.93 | 4.72 |
| j | 1.26 | 7.94 | 0.70 | 1.52 | 3.84 |
| k | 1.59 | 10.00 | 0.56 | 1.17 | 3.06 |
| l | 2.01 | 12.60 | 0.43 | 0.85 | 2.48 |
| m | 2.53 | 15.90 | 0.36 | 0.74 | 1.96 |
| n | 3.18 | 20.00 | 0.27 | 0.58 | 1.57 |
| o | 3.99 | 25.10 | 0.22 | 0.48 | 1.24 |
| p | 5.03 | 31.80 | 0.19 | 0.38 | 0.98 |
| q | 6.33 | 39.80 | 0.14 | 0.30 | 0.77 |
| r | 7.97 | 50.10 | 0.11 | 0.24 | 0.62 |

TABLE 12-continued

Effect of Frequency on Damping Coefficients of Various Acoustical Blend Foams in Torsional DMS Test

| Test No. | Frequency Hz | Ang. Vel. rad/s | Damping Coefficient $E^{+9}$ dyne sec/cm² | | |
|---|---|---|---|---|---|
| | | | LDPE | LDPE/ES 80/20 | LDPE/ES 60/40 |
| s | 10.04 | 63.10 | 0.09 | 0.18 | 0.49 |
| t | 12.64 | 79.40 | 0.08 | 0.15 | 0.39 |
| u | 15.92 | 100.00 | 0.06 | 0.13 | 0.31 |

Dynamic Cushioning Testing

As shown in the tests of this example, the LDPE/ES blend foams manifest their superior energy absorbing capabilities in dynamic cushioning as well. In this example, the foams made above are prepared into drop test specimens of approximately 2" (5.08 cm) cubes. Several foam strands are cut and heat-welded together to prepare the test specimens. A specimen is set on a table so that its vertical direction (of the foam strand) is aligned vertically. A weight is dropped onto the specimens from an approximately 61 cm (24") height. An accelerometer adhered on the top of the weight records the deceleration of the weight by the foam specimen. Four additional drops are made on the same specimen with one-minute Interval given between the drops. The tests are repeated with another weight with a new specimen. Weights are selected to exert a static stress ranging from approximately 1.8 kPa to 13.4 kPa. The thickness of the foam specimen before and after the drop tests are recorded.

The data are summarized in Table 13. In general, the LDPE/ES blend foams, are shown to be better shock mitigating materials that the LDPE foam. The blend foams give a lower minimum peak deceleration. The shock-mitigating capability of the LDPE/ES: 60/40 blend foam is especially remarkable as the foam records a low peak deceleration at a wide range of static loading. All foams recovered well after the drop tests as the recovery data for a heavy weight in Table 13 indicate.

TABLE 13

Dynamic Cushioning Properties

| Test No. | Polymer Type | Peak Deceleration at Static Stress (kPa) (1) | | | | | | Recovery 9.3 kPa after 1 hr (2) |
|---|---|---|---|---|---|---|---|---|
| | | 1.8 | 2.4 | 3.4 | 6.0 | 9.3 | 13.4 | |
| 1.1* | LDPE | 65 | 56 | 57 | 60 | 89 | N.D.³ | 95 |
| 1.2 | LDPE/ES 80/20 | 59 | 58 | 54 | 60 | 99 | N.D.³ | 95 |
| 1.3 | LDPE/ES 60/40 | 62 | 62 | 51 | 55 | 60 | 81 | 96 |

* Not an example of this invention.
1 The average of peak decelerations during second through fifth drops in Gs.
2 Thickness as a percentage of the initial one hour after the drop tests with the loading of 9.3 kPa.
3 Not Determined.

EXAMPLE 27

LDPE Polymer

The LDPE polymer used in this example has a melt index of 1.8 per ASTM 1238 at 190° C./2.16 kg and a density of 0.923 g/cm³.

ES Interpolymer

The ES interpolymer employed in this example is prepared in a manner similar to that of interpolymer C and contains 45.9 wt. (18.3 mol) percent styrene moiety and a melt index ($I_2$) of 0.43.

The apparatus and the method of preparation of the foam are essentially the same as in Example 26. A good-quality foam of a substantially closed cell structure is made from the blend. The foam has a thickness of 19 mm, width of 34.5 mm, density of 29 kg/m³ and cell size of 1.2 mm.

The dynamic mechanical properties of the foam are determined using a forced vibration apparatus (MTS 831 Elastomer Test System). In the test, a rectangular specimen is cyclically compressed with a predetermined dynamic load at a certain frequency and the dynamic strain induced in the specimen is monitored. In practice, a rectangular specimen of 32.9 mm in width, 34.6 mm in depth and 6.5 is mm in height is cut out of the extruded foam strand and subjected to a dynamic mechanical test in a temperature-controlled chamber. The temperature of the chamber is maintained at –10° C. The mean load is set at –20 Newtons and the dynamic load is set at 15 Newtons. The frequency (f) of cyclic compression is sweeped from 1 Hz to 101 Hz at a 2 Hz step.

From the dynamic stiffness (K*), phase angle (δ) and shape factor, storage modulus of elasticity (E'), loss modulus of elasticity (E") and damping coefficient of the foam specimen are calculated by the following equations:

$$\text{shape factor} = \frac{\text{width} \times \text{depth}}{\text{height}} \quad (A1)$$

$$E' = \frac{K'' \times \cos\delta}{\text{shapefactor}} \quad (A2)$$

$$E'' = \frac{K'' \times \sin\delta}{\text{shapefactor}} \quad (A3)$$

$$C = \frac{K'' \sin\delta}{2\pi f} = \frac{E'' \times \text{shapefactor}}{2\pi f} \quad (A4)$$

The foam made in Test 1.1 of Example 23 is similarly tested for comparison. The specimen of the Test 1.1 foam has a width of 32 mm, depth of 35.2 mm and height of 6.8 mm. The data for these two foam specimens at selected frequencies of 1, 11 and 101 Hz are set forth in Table 13.

TABLE 14

| Test No. | At 1 Hz | | | | At 11 Hz | | | | At 101 Hz | | | |
|---|---|---|---|---|---|---|---|---|---|---|---|---|
|  | E' (1) | E" (2) | tan δ (3) | C (4) | E' (1) | E" (2) | tan δ (3) | C (4) | E' (1) | E" (2) | tan δ (3) | C (4) |
| 1.1* | 10.6 | 0.23 | 0.21 | 5.93 | 1.36 | 0.23 | 0.17 | 0.54 | 1.62 | 0.26 | 0.18 | 0.07 |
| 4 | 1.29 | 0.35 | 0.27 | 9.71 | 1.90 | 0.38 | 0.20 | 0.96 | 2.66 | 0.43 | 0.16 | 0.12 |

* Not an example of this invention
(1) storage modulus in N/mm$^2$.
(2) loss modulus in N/mm$^2$.
(3) E"/E'
(4) Damping coefficient in N-sec/mm.
From Table 143, it is evident that the LDPE/ES (465) blend foam has the better damping capability than an LDPE foam at −10° C.

EXAMPLE 28

In this example, 10 grams of a ethylene-styrene (ES) copolymer that is used in Example 23 (ethylene-styrene copolymer (I); see table 1A & 1B) is melt blended with 10 grams of an ethylene-acrylic acid copolymer (EAA) available from and a registered trademark of is The Dow Chemical Company as Primacor™ 3340 (6.5 wt. % acrylic acid and 9 melt index) using a Brabender mixer. The mixing is done at 180° C. for 15 minutes at a rotor rotating speed of 30 rpm. The polymer blend is molded on to a steel bar maintained at 180° C. using a hot press in order to determine its damping capability in accordance with the SAE J1637 test. The steel bar has the dimensions of 0.8 mm in thickness, 12.7 mm in width and 225 mm in length. Approximately a 200 mm length of the steel bar is covered with the polymer layer of uniform thickness of approximately 1.2 mm. Adhesion between the steel bar and the polymer layer is excellent. For comparison, a steel bar specimen coated with pure Primacor™ 3340 resin of approximately 1.2 mm thickness is also prepared.

The specimens are tested according to the SAE J1637 test for their damping capabilities at an ambient temperature of 23° C. The specimen coated with an EAA/ES layer recorded a damping ratio (factor) of 0.79%. This damping ratio is compared with the damping ratio of a bare steel bar (0.13%) and that of a steel bar adhered with a pure EAA layer (0.59%).

EXAMPLES 29–31

The resins in Table 15 were employed in the following Examples 29–31. The LDPE used was that used in Example 26 and had a melt index, I$_2$, of 1.8 g/10 min and a density of 0.923 g/cm$^3$. The ethylene styrene interpolymers ESI #'s 1 through 4 were prepared as follows:
Reactor Description The single reactor used was a 6 gallon (22.7 L), oil jacketed, Autoclave continuously stirred tank reactor (CSTR). A magnetically coupled agitator with Lightning A-320 impellers provides the mixing. The reactor ran liquid full at 475 psig (3,275 kPa). Process flow was in the bottom and out the top. A heat transfer oil was circulated through the jacket of the reactor to remove some of the heat of reaction. After the exit from the reactor was a micromotion flow meter that measured flow and solution density. All lines on the exit of the reactor were traced with 50 psi (344.7 kPa) steam and insulated.
Procedure Ethylbenzene or toluene solvent was supplied to the mini-plant at 30 psig (207 kPa). The feed to the reactor was measured by a FMicro-Motion mass flow meter. A variable speed diaphragm pump controlled the feed rate. At the discharge of the solvent pump a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of microflow needle valves. Uninhibited styrene monomer was supplied to the mini-plant at 30 psig (207 kpa). The feed to the reactor was measured by a Micro-Motion mass flow meter. A variable speed diaphragm pump controlled the feed rate. The styrene streams was mixed with the remaining solvent stream. Ethylene was supplied to the mini-plant at 600 psig (4,137 kPa). The ethylene stream was measured by a Micro-Motion mass flow meter just prior to the Research valve controlling flow. A Brooks flow meter/controllers was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also enter the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occured as the effluent exited the post reactor heater and the pressure was dropped from 475 psig (3,275 kPa) down to ~250mm of pressure absolute at the reactor pressure control valve. This flashed polymer entered a hot oil jacketed devolatilizer. Approximately 85 percent of the volatiles were removed from the polymer in the devolatilizer. The volatiles exit the top of the devolatilizer. The stream was condensed and with a glycol jacketed exchanger, entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer seperated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

In all cases the three component catalyst stream employed modified methylaluminoxane Type 3A, CAS# 146905-79-5. The catalyst used to prepare ESI #1 was (t-butylamido) dimethyl(tetramethylcyclopentadienyl)silane-titanium (II) 1,3-pentadiene, and the cocatalyst was bis-hydrogenated tallowalkyl methylammonium tetrakis(pentafluorophenyl) borate.

The catalyst used to prepare ESI #'s 2, 3 and 4 was dimethyl[N-(1,1-dimethylethyl)-1,1-dimethyl-1-[(1,2,3,4,5-.eta.)-1,5,6,7-tetrahydro-3-phenyl-s-indacen-1-yl] silanaminato(2-)-N]-titanium and the cocatalyst was tris (pentafluorophenyl)boron, CAS# 001109-15-5.

The various process conditions and resulting interpolymer properties are summarized in Table 15.

The LDPE/ESI resin blend foams were made in an apparatus comprising an extruder, a mixer, a cooler, and an extrusion die in series. Resin granules of the LDPE and ESI were dry tumble blended and fed via a hopper to the extruder. The ESI resin contained a small amount of the talc. The granules were melted and blended to form a polymer melt. The polymer melt was fed to the mixer where isobutane, a blowing agent, was incorporated to form a polymer gel. The polymer gel was conveyed through the cooler to lower the temperature of the gel to a desirable foaming temperature. The cooled polymer gel is conveyed through the extrusion die into a zone of lower pressure to form the expanded foam product.

Use of LDPE/ESI resin blends afforded a significant increase of the foaming temperature window to 3–4° C. This increase is significant since the foaming window is typically only 1° C. for foams containing only LOPE resin. Expansion of the foaming window reduces the incidence of "freeze-off" (solidification of resin prior to exiting the extrusion die) and production scrap generation. High quality, low density closed cell foams were produced without encountering freeze-off.

Based upon the results, useful ESI resins include those having 30–75 weight percent total styrene content, melt index of 0.5–20, and up to 20 weight percent aPS (atactic

TABLE 15

| Resin | Reactor Temp °C. | Solvent | MMAO/ Ti Ratio | B/Ti Ratio | Melt Index (I$_2$) | Percent aPS | Inter-polymer % Styrene wt % | mol % |
|---|---|---|---|---|---|---|---|---|
| ESI #1 | 85 | Ethylbenzene | 6 | 1.2 | 1.0 | 14 | 38 | 17 |
| ESI #2 | 93 | Toluene | 7 | 3.0 | 1.5 | 0.8 | 47 | 20 |
| ESI #3 | 79 | Toluene | 9 | 3.5 | 1.5 | 1.8 | 69 | 39 |
| ESI #4 | 97 | Toluene | 3.5 | 3.5 | 10.0 | 0.2 | 31 | 11 |

Weight percent styrene in the interpolymer is the percent styrene incorporated in the interpolymer based upon the total weight of the ESI resin.
Mole percent styrene in the interpolymer is the percent styrene incorporated in the inter-polymer based upon the total moles of ESI resin
Percent aPS is the percent atactic polystyrene based upon total weight of ESI resin
I$_2$ is the melt index measured at 190° C. using a weight of 2.16 kg

EXAMPLE 29

LDPE/ESI resin blend foams of the present invention were made to demonstrate the effect of ESI in broadening the observed foaming temperature window versus that typically observed in making conventional LDPE foams.

polystyrene) and preferably less than 2 weight percent aPS. Total styrene content in the ESI resin is the weight of styrene incorporated in the ethylene/styrene interpolymer plus the weight of the free constituent aPS divided by the total weight of the ESI resin. Results are set forth in Table 16 below.

TABLE 16

| Sample | ic4 (phr) | % LDPE | Type of ESI Resin | % ESI inter-polymer | % aPS | T$_f$ (° C.) | Density pcf (Kg/m$^3$) | Open Cell Content Percent |
|---|---|---|---|---|---|---|---|---|
| 1 | 7.5 | 80 | ESI #2 | 19.8 | 0.2 | 108 | 2.43 (38.9) | 4.4 |
| 2 | 7.5 | 80 | ESI #2 | 19.8 | 0.2 | 106 | 2.37 (37.9) | 4.8 |
| 3 | 7.5 | 80 | ESI #1 | 17.2 | 2.8 | 111 | 2.52 (40.3) | 6.6 |
| 4 | 7.5 | 80 | ESI #1 | 17.2 | 2.8 | 110 | 2.26 (36.2) | 4.7 |
| 5 | 7.5 | 80 | ESI #3 | 19.6 | 0.4 | 110 | 2.36 (37.8) | 5.8 |
| 6 | 7.5 | 80 | ESI #3 | 19.6 | 0.4 | 109 | 2.22 (35.5) | 3.2 |
| 7 | 7.5 | 80 | ESI #3 | 19.6 | 0.4 | 108 | 2.26 (36.2) | 2.9 |
| 8 | 7.5 | 80 | ESI #3 | 19.6 | 0.4 | 107 | 2.33 (37.3) | 3.1 |
| 9 | 7.5 | 80 | ESI #3 | 19.6 | 0.4 | 106 | 2.32 (37.1) | 4.9 |
| 10 | 7.5 | 50 | ESI #3 | 49.1 | 0.9 | 108 | 2.24 (35.8) | 3.3 |

TABLE 16-continued

| Sample | ic4 (phr) | % LDPE | Type of ESI Resin | % ESI inter-polymer | % aPS | $T_f$ (° C.) | Density pcf (Kg/m³) | Open Cell Content Percent |
|---|---|---|---|---|---|---|---|---|
| 11 | 7.5 | 50 | ESI #3 | 49.1 | 0.9 | 106 | 2.00 (32.0) | 2.2 |
| 12 | 7.5 | 50 | ESI #3 | 49.1 | 0.9 | 105 | 1.92 (30.7) | 4.3 |
| 13 | 7.5 | 50 | ESI #3 | 49.1 | 0.9 | 104 | 1.95 (31.2) | 3.2 |
| 14 | 10 | 50 | ESI #4 | 49.9 | 0.1 | 111 | 1.91 (30.6) | 4.0 |
| 15 | 10 | 50 | ESI #4 | 49.9 | 0.1 | 110 | 1.85 (29.6) | 4.0 |
| 16 | 10 | 50 | ESI #4 | 49.9 | 0.1 | 109 | 1.71 (27.4) | 3.7 |
| 17 | 10 | 50 | ESI #4 | 49.9 | 0.1 | 108 | 1.75 (28.0) | 3.8 | ic4 in the isobutane in parts per hundred parts by weight of resin
aPS is the atactic polystyrene
$T_f$ is the foaming temperature in degree Centigrade
pcf is the density in pounds per cubic foot
kg/m³ is the density in kilograms per cubic meter
% ESI interpolymer is the weight percent ESI interpolymer based upon the total weight of ESI, aPS, and LDPE.
% aPS is the weight percent aPS based upon the total weight of ESI, aPS, and LDPE
phr is the parts per hundred parts by weight of resin (polymer)

EXAMPLE 30

Closed cell LDPE/ESI resin blend foams were made in accordance with the present invention. A comparative example of a conventional, closed cell LDPE foam (Sample #1) was also made.

The present foams were made with the apparatus and techniques described in Example 29.

The present foams were closed cell and exhibited smaller cell size, better skin quality, better toughness, better drape/conformability, and better softness compared to the closed cell LDPE foam. Results are set forth in Table 17.

The foams made with LDPE/ESI resin blends and the foam of the comparative example were kept at ambient temperature and measured for volume change over time. The minimum or maximum volume, whichever exhibited the most deviation, was noted. Volume change was measured by water displacement. A maximum dimensional change of not more than 15 percent (compared to the initial volume measured 60 seconds after extrusion) was considered desirable.

The foams made with LDPE/ESI Resin #3 exhibited superior dimensional stability compared to the LDPE foam

TABLE 17

| Sample # | ic4 (phr) | Percent LDPE | Type of ESI Resin | % ESI inter-polymer | % aPS | $T_f$ (° C.) | Density pcf (kg/m³) | Open Cell Content (%) | Cell Size (mm) |
|---|---|---|---|---|---|---|---|---|---|
| 1* | 7.5 | 100 |  | 0 | 0 | 112 | 2.35 (37.6) | 4.5 | 1.63 |
| 2 | 7.5 | 50 | ESI #3 | 49.1 | 0.9 | 105 | 1.92 (30.7) | 4.3 | 0.90 |
| 3 | 7.5 | 80 | ESI #2 | 19.8 | 0.2 | 106 | 2.37 (37.9) | 4.8 | 1.16 |
| 4 | 7.5 | 80 | ESI #1 | 17.2 | 2.8 | 110 | 2.26 (36.2) | 4.7 | 1.08 |
| 5 | 7.5 | 80 | ESI #3 | 19.6 | 0.4 | 108 | 2.26 (36.2) | 2.9 | 1.16 |
| 6 | 7.5 | 50 | ESI #2 | 49.6 | 0.4 | 106 | 2.38 (38.1) | 7.0 | 1.16 |
| 7 | 10 | 50 | ESI #4 | 49.9 | 0.1 | 109 | 1.71 (27.4) | 3.7 | 1.02 | ic4 is the isobutane in parts per hundred parts by weight of resin
aPS is the atactic polystyrene
$T_f$ is the foaming temperature in degrees Centigrade
pcf is the density in pounds per cubic foot
kg/m³ is the density in kilograms per cubic meter
% ESI interpolymer is the weight percent ESI interpolymer based upon the total weight of ESI, aPS and LDPE.
aPS is the weight percent aPS based upon the total weight of ESI, aPS, and LDPE
phr is the parts per hundred parts by weight of resin (polymer)
* not an example of the present invention

EXAMPLE 31

Closed cell LDPE/ESI resin blend foams which exhibited excellent dimensional stability without the use of permeability modifiers were made in accordance with the present invention. A comparative example of a conventional, closed cell LDPE was also made without the use of permeability modifiers.

The present foams and the foam of the comparative example were made with the apparatus and technique described in Example 29. Two different ESI resins were employed.

of the comparative example and the foams made with LDPE/ESI Resin #2. Results are set forth in Table 18 below.

Excellent dimensional stability may permit foams to be made with fast permeating blowing agents such as carbon dioxide and isobutane without the need to use permeability modifiers like glycerol monostearate. The use of fast permeating blowing agents without permeability modifiers may afford faster curing times (i.e., to very low levels of residual blowing agents and/or replacement of blowing agent in cell gas with air from the environment).

TABLE 18

| Sample | ic4 (phr) | % LDPE | Type of ESI Resin | % ESI interpolymer | % aPS | T$_f$ (° C.) | Density pcf (kg/m$^3$) | Open Cell Content (%) | Maximum Volume Change (%) |
|---|---|---|---|---|---|---|---|---|---|
| 1* | 7.5 | 100 |  | 0 | 0 | 112 | 2.35 (37.6) | 4.5 | −28.45 |
| 2 | 7.5 | 50 | ESI #3 | 49.1 | 0.9 | 110 | 2.67 (42.7) | 4.7 | +3.9 |
| 3 | 7.5 | 50 | ESI #3 | 49.1 | 0.9 | 108 | 2.24 (35.8) | 3.3 | +4.3 |
| 4 | 7.5 | 50 | ESI #3 | 49.1 | 0.9 | 106 | 2.00 (32.0) | 2.2 | +2.7 |
| 5 | 7.5 | 50 | ESI #3 | 49.1 | 0.9 | 105 | 1.92 (30.7) | 4.3 | +4.3 |
| 6 | 7.5 | 50 | ESI #3 | 49.1 | 0.9 | 104 | 1.95 (31.2) | 3.2 | +3.4 |
| 7 | 7.5 | 50 | ESI #2 | 49.6 | 0.4 | 106 | 2.38 (38.1) | 7.0 | −38.8% |
| 8 | 7.5 | 50 | ESI #2 | 49.6 | 0.4 | 104 | 2.94 (47.00) | 6.1 | −37.2% | ic4 is the isobutane in parts per hundred parts by weight of resin
aPS is the atactic polystyrene
T$_f$ is the foaming temperature in degrees Centigrade
pcf is the density in pounds per cubic foot
kg/m$^3$ is the density in kilograms per cubic meter
% ESI interpolymer is the weight percent ESI interpolymer based upon the total weight of ESI, aPS and LDPE.
% aPS is the weight percent aPS based upon the weight of ESI, aPS, and LDPE
phr is the parts per hundred parts by weight of resin (polymer)
* not an example of the present invention

What is claimed is:

1. A fabricated article other than a film comprising a blend of polymeric materials consisting of
(A) from 1 to 99 weight percent of one or more α-olefin/vinylidene monomer non-crosslinked substantially random interpolymers, wherein the distribution of the monomers of said interpolymers can be described by the Bernoulli statistical model or by a first or second order Markovian statistical model, and each having been made from monomer components comprising:
  (1) from 0.5 to 65 mole percent of either
    (a) at least one vinylidene aromatic monomer, or
    (b) at least one hindered aliphatic vinylidene monomer, corresponding to the formula:

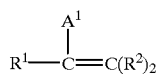

wherein A$^1$ is a sterically bulky, aliphatic or cycloaliphatic substituent of up to 20 carbons, R$^1$ is selected from the group of radicals consisting of hydrogen and alkyl radicals containing from 1 to 4 carbon atoms, preferably hydrogen or methyl; each R$^2$ is independently selected from the group of radicals consisting of hydrogen and alkyl radicals containing from 1 to 4 carbon atoms, preferably hydrogen or methyl; or alternatively R$^1$ and A$^1$ together form a ring system or
    (c) a combination of at least one vinylidene aromatic monomer and at least one hindered aliphatic vinylidene monomer; and
  (2) from 35 to 99.5 mole percent of at least one aliphatic α-olefin having from 2 to 20 carbon atoms; and
(B) from 99 to 1 weight percent of one or more homopolymers or copolymers of monomer components comprising aliphatic α-olefins having from 2 to 20 carbon atoms, or aliphatic α-olefins having from 2 to 20 carbon atoms and containing polar groups.

2. A fabricated article of claim 1 wherein
(i) said blend comprises from 5 to 95 weight percent of component (A) and from 95 to 5 percent by weight of component (B);
(ii) component (A) contains from 1 to 55 mole percent of component (A-1) residues and from 45 to 99 mole percent of component (A-2) residues; and
(iii) component (B) comprises a homopolymer or copolymer of monomer components comprising two or more α-olefins having from 2 to 12 carbon atoms.

3. A fabricated article of claim 1 wherein
(i) said blend comprises from 10 to 90 weight percent of component (A) and from 90 to 10 percent by weight of component (B); and
(ii) component (A) contains from 2 to 50 mole percent of component (A-1) residues and from 98 to 50 mole percent of component (A-2) residues.

4. A fabricated article of claim 1 wherein
(i) component (A) is a substantially random interpolymer of styrene and ethylene or a combination of styrene and ethylene and at least one C$_{3-8}$ α-olefin; and
(ii) component (B) is a homopolymer of ethylene or propylene; or a copolymer of ethylene or propylene and at least one other α-olefin containing from 4 to 8 carbon atoms; or a copolymer of ethylene or propylene and at least one of acrylic acid, vinyl acetate, maleic anhydride or acrylonitrile; or a terpolymer made from ethylene, propylene and a diene.

5. A fabricated article of claim 2 wherein
(i) component (A) is a substantially random interpolymer of styrene and ethylene, or styrene, ethylene and at least one other α-olefin containing from 3 to 8 carbon atoms;
(ii) component (B) is a homopolymer of ethylene or propylene, or a copolymer of ethylene and/or propylene and at least one other α-olefin containing from 4 to 8 carbon atoms; or a terpolymer of ethylene, propylene and at least one of 4-methyl pentene, butene-1, hexene-1 or octene-1.

6. A fabricated article of claim 3 wherein
(i) component (A) is a substantially random interpolymer of styrene and ethylene, or styrene and a combination of ethylene and at least one of propylene, 4-methyl pentene, butene-1, hexene-1, octene-1 or norbornene;
(ii) component (B) is a homopolymer of ethylene or propylene; or a copolymer of ethylene or propylene and at least one other α-olefin containing from 4 to 8 carbon atoms; or a terpolymer of ethylene, propylene and a diene.

7. A fabricated article of claim 1 wherein
(1) component (A) is a substantially random interpolymer of styrene and ethylene or styrene and a combination of ethylene and at least one of propylene, 4-methyl pentene, butene-1, hexene-1, octene-1 or norbornene;
(2) component (B) is a homopolymer of ethylene or a combination of ethylene and at least one of propylene, 4-methyl pentene, butene-1, hexene-1 or octene-1.

8. A fabricated article of claim 1 wherein
(i) component (A) is a substantially random interpolymer of styrene and ethylene; and
(ii) component (B) is selected from:
   (1) one or more homopolymers of ethylene,
   (2) one or more homopolymers of propylene,
   (3) one or mores chlorinated polyethylenes,
   (4) one or more copolymers of ethylene and propylene,
   (5) one or more copolymers of ethylene, propylene and a diene,
   (6) one or more copolymers of ethylene and octene-1,
   (7) one or more copolymers of ethylene, propylene and norbornene,
   (8) one or more copolymers of ethylene and acrylic acid,
   (9) one or more copolymers of ethylene and vinyl acetate, or
   (10) any combination of any two or more of polymers (1)–(9).

9. A fabricated article of claim 1 wherein
(1) component (A) is a substantially random interpolymer made from 1–10 mole percent styrene and 90–99 mole percent ethylene or a combination of ethylene and at least one of propylene, 4-methyl pentene, butene-1, hexene-1, octene-1 or norbornene; and
(2) component (B) is selected from:
   (1) one or more homopolymers of ethylene,
   (2) one or more homopolymers of propylene,
   (3) one or mores chlorinated polyethylenes,
   (4) one or- more copolymers of ethylene and propylene,
   (5) one or more copolymers of ethylene, propylene and a diene,
   (6) one or more copolymers of ethylene and octene-1,
   (7) one or more copolymers of ethylene, propylene and norbornene,
   (8) one or more copolymers of ethylene and acrylic acid,
   (9) one or more copolymers of ethylene and vinyl acetate, or
   (10) any combination of any two or more of polymers (1)–(9).

10. A fabricated article of claim 1 wherein
(1) component (A) is a substantially random interpolymer made from 10–25 mole percent styrene and 75 to 90 mole percent of ethylene or a combination of ethylene and at least one of propylene, 4-methyl pentene, butene-1, hexene-1, octene-1 or norbornene; and
(2) component (B) is selected from:
   (1) one or more homopolymers of ethylene,
   (2) one or more homopolymers of propylene,
   (3) one or mores chlorinated polyethylenes,
   (4) one or more copolymers of ethylene and propylene,
   (5) one or more copolymers of ethylene, propylene and a diene,
   (6) one or more copolymers of ethylene and octene-1,
   (7) one or more copolymers of ethylene, propylene and norbornene,
   (8) one or more copolymers of ethylene and acrylic acid,
   (9) one or more copolymers of ethylene and vinyl acetate, or
   (10) any combination of any two or more of polymers (1)–(9).

11. A fabricated article of claim 1 wherein
(1) component (A) is a substantially random interpolymer made from 25–50 mole percent styrene and 50 to 75 mole percent of ethylene or a combination of ethylene and at least one of propylene, 4-methyl pentene, butene-1, hexene-1, octene-1 or norbornene; and
(2) component (B) is selected from:
   (1) one or more homopolymers of ethylene,
   (2) one or more homopolymers of propylene,
   (3) one or mores chlorinated polyethylenes,
   (4) one or more copolymers of ethylene and propylene,
   (5) one or more copolymers of ethylene, propylene and a diene,
   (6) one or more copolymers of ethylene and octene-1,
   (7) one or more copolymers of ethylene, propylene and norbornene,
   (8) one or more copolymers of ethylene and acrylic acid,
   (9) one or more copolymers of ethylene and vinyl acetate, or
   (10) any combination of any two or more of polymers (1)–(9).

12. A fabricated article of claim 1 consisting of
(A) from 25 to 99 weight percent of a substantially random interpolymer made from monomer components comprising 1–10 mole percent styrene and 90 - 99 mole percent ethylene or a combination of ethylene and at least one of propylene, 4-methyl pentene, butene-1, hexene-1, octene-1 or norbornene; and
(B) from 1 to 75 weight percent of a polymer component selected from:
   (1) one or more homopolymers of ethylene,
   (2) one or more homopolymers of propylene,
   (3) one or mores chlorinated polyethylenes,
   (4) one or more copolymers of ethylene and propylene,
   (5) one or more copolymers of ethylene, propylene and a diene,
   (6) one or more copolymers of ethylene and octene-1,
   (7) one or more copolymers of ethylene, propylene and norbornene,
   (8) one or more copolymers of ethylene and acrylic acid,
   (9) one or more copolymers of ethylene and vinyl acetate, or
   (10) any combination of any two or more of polymers (1)–(9).

13. A fabricated article of claim 1 consisting of
(A) from 1 to 50 weight percent of an interpolymer made from monomer, components comprising 1–10 mole percent styrene and 90–99 mole percent ethylene or a combination of ethylene and at least one of propylene, 4-methyl pentene, butene-1, hexene-1, octene-1 or norbornene; and
(B) from 50 to 99 weight percent of a polymer component selected from:
   (1) one or more homopolymers of ethylene,
   (2) one or more homopolymers of propylene,
   (3) one or mores chlorinated polyethylenes,
   (4) one or more copolymers of ethylene and propylene,
   (5) one or more copolymers of ethylene, propylene and a diene,
   (6) one or more copolymers of ethylene and octene-1, (7) one or more copolymers of ethylene, propylene and is norbornene,
(8) one or more copolymers of ethylene and acrylic acid,
(9) one or more copolymers of ethylene and vinyl acetate, or
(10) any combination of any two or more of polymers (1)–(9).

14. A fabricated article of claim 1 consisting of
(A) from 50 to 99 weight percent of an interpolymer made from monomer components comprising 1–10 mole percent styrene and 90–99 mole percent ethylene or a combination of ethylene and at least one of propylene, 4-methyl pentene, butene-1, hexene-1, octene-1 or norbornene; and
(B) from 1 to 50 weight percent of a polymer component selected a from:
(1) one or more homopolymers of ethylene,
(2) one or more homopolymers of propylene,
(3) one or mores chlorinated polyethylenes,
(4) one or more copolymers of ethylene and propylene,
(5) one or more copolymers of ethylene, propylene and a diene,
(6) one or more copolymers of ethylene and octene-1,
(7) one or more copolymers of ethylene, propylene and norbornene,
(8) one or more copolymers of ethylene and acrylic acid,
(9) one or more copolymers of ethylene and vinyl acetate, or
(10) any combination of any two or more of polymers (1)–(9).

15. A fabricated article of claim 1 consisting of
(A) from 25 to 99 weight percent of an interpolymer made from monomer components comprising 10–25 mole percent styrene and 75 to 90 mole percent of ethylene or a combination of ethylene and at least one of propylene, 4-methyl pentene, butene-1, hexene-1, octene-1 or norbornene; and
(B) from 1 to 75 weight percent of a polymer component selected from:
(1) one or more homopolymers of ethylene,
(2) one or more homopolymers of propylene,
(3) one or mores chlorinated polyethylenes,
(4) one or more copolymers of ethylene and propylene,
(5) one or more copolymers of ethylene, propylene and a diene,
(6) one or more copolymers of ethylene and octene-1,
(7) one or more copolymers of ethylene, propylene and norbornene,
(8) one or more copolymers of ethylene and acrylic acid,
(9) one or more copolymers of ethylene and vinyl acetate, or (10) any combination of any two or more of polymers (1)–(9).

16. A fabricated article of claim 1 wherein each of components (A) and (B) are produced by polymerization or copolymerization of the appropriate monomers in the presence of a metallocene catalyst and a co-catalyst.

17. A fabricated article of any of claims 1–16 in the form of an injection, compression, extruded or blow molded part.

* * * * *